United States Patent
Takahashi et al.

(10) Patent No.: US 9,920,181 B2
(45) Date of Patent: Mar. 20, 2018

(54) POLYLACTIC ACID RESIN COMPOSITION, MOLDED PRODUCT, AND METHOD OF MANUFACTURING POLYLACTIC ACID RESIN COMPOSITION

(71) Applicant: Toray Industries, Inc., Tokyo (JP)

(72) Inventors: Yoshitake Takahashi, Aichi (JP); Takuma Naotsuka, Aichi (JP); Yasuto Tachibana, Aichi (JP); Hiroyuki Ome, Aichi (JP)

(73) Assignee: Toray Industries, Inc. (JP)

( * ) Notice: Subject to any disclaimer, the term of this patent is extended or adjusted under 35 U.S.C. 154(b) by 269 days.

(21) Appl. No.: 14/433,391

(22) PCT Filed: Sep. 12, 2013

(86) PCT No.: PCT/JP2013/074766
§ 371 (c)(1),
(2) Date: Apr. 3, 2015

(87) PCT Pub. No.: WO2014/057766
PCT Pub. Date: Apr. 17, 2014

(65) Prior Publication Data
US 2015/0259504 A1    Sep. 17, 2015

(30) Foreign Application Priority Data
Oct. 10, 2012  (JP) .................................. 2012-225544

(51) Int. Cl.
*C08K 3/32* (2006.01)
*C08G 63/06* (2006.01)
*C08L 67/04* (2006.01)
*C08L 101/16* (2006.01)

(52) U.S. Cl.
CPC .............. *C08K 3/32* (2013.01); *C08G 63/06* (2013.01); *C08L 67/04* (2013.01); *C08K 2003/324* (2013.01); *C08K 2003/325* (2013.01); *C08L 101/16* (2013.01); *C08L 2205/02* (2013.01)

(58) Field of Classification Search
CPC ..................................................... C08K 3/32
See application file for complete search history.

(56) References Cited

U.S. PATENT DOCUMENTS

| | | | |
|---|---|---|---|
| 2005/0001358 A1 | 1/2005 | Nakazawa et al. | |
| 2009/0234094 A1 | 9/2009 | Suzuki et al. | |
| 2011/0028629 A1 | 2/2011 | Yamamura et al. | |
| 2011/0224342 A1* | 9/2011 | Masuda | C08J 5/18 524/148 |
| 2013/0158209 A1 | 6/2013 | Takahashi et al. | |
| 2013/0165601 A1 | 6/2013 | Takahashi et al. | |
| 2013/0287903 A1* | 10/2013 | Okutsu | C08L 67/04 426/106 |
| 2013/0310502 A1 | 11/2013 | Naito et al. | |

FOREIGN PATENT DOCUMENTS

| | | |
|---|---|---|
| JP | 2862071 | 2/1999 |
| JP | 2003-192884 A | 7/2003 |
| JP | 2007-099934 A | 4/2007 |
| JP | 2008-120894 A | 5/2008 |
| JP | 2009-079104 A | 4/2009 |
| JP | 2010-001338 A | 1/2010 |
| JP | 2010-084266 A | 4/2010 |
| WO | 2009/119336 A1 | 10/2009 |
| WO | 2012/029393 A1 | 3/2012 |
| WO | 2012/111587 A1 | 8/2012 |

OTHER PUBLICATIONS

Decision to Grant a Patent dated Jul. 11, 2017, of corresponding Japanese Application No. 2013-543449, along with an English translation.

* cited by examiner

*Primary Examiner* — Megan McCulley
(74) *Attorney, Agent, or Firm* — DLA Piper LLP (US)

(57) ABSTRACT

A polylactic acid resin composition includes: 0.005 parts by weight to 1.2 parts by weight of a metal phosphate represented by Formula (1):

$$M_x H_y PO_z \qquad (1)$$

(in Formula (1), M is an alkali metal atom or an alkaline earth metal atom, and x, y, and z are integers satisfying $1 \leq x \leq 2$, $1 \leq y \leq 4$, and $2 \leq z \leq 8$, respectively) with respect to 100 parts by weight of a polylactic acid resin including a poly-L-lactic acid component and a poly-D-lactic acid component, wherein a crystallization enthalpy of crystals in the polylactic acid resin is not less than 5 J/g when a temperature of the polylactic acid resin composition is increased to 250° C., and the temperature is kept constant for 3 minutes, followed by decreasing the temperature at a cooling rate of 20° C./min in differential scanning calorimetry.

10 Claims, No Drawings

POLYLACTIC ACID RESIN COMPOSITION, MOLDED PRODUCT, AND METHOD OF MANUFACTURING POLYLACTIC ACID RESIN COMPOSITION

TECHNICAL FIELD

This disclosure relates to a polylactic acid resin composition including a metal phosphate, which has excellent heat resistance, crystallization properties, mechanical properties, and durability, a molded product, and a method of manufacturing the polylactic acid resin composition.

BACKGROUND

Polylactic acid is practically a melt-moldable macromolecule. Since the polylactic acid is biodegradable, it has been developed as a biodegradable plastic, which is degraded in a natural environment after use, and is released as carbon dioxide gas and water. Meanwhile, renewable resources (biomass) derived from carbon dioxide and water are used as raw materials of the polylactic acid itself, and thus carbon dioxide released after use does not contribute to increase an amount of carbon dioxide in the earth environment. As such, in recent years, the polylactic acid is expected to be used as an eco-friendly material because of its property of carbon neutrality. Moreover, lactic acid, which is a monomer of polylactic acid, can be manufactured at low cost by using a fermentation method utilizing microorganisms, and is expected to be used as an alternative material for a universal polymer made from a petroleum plastic. However, compared to petroleum plastics, polylactic acid is less productive because it is not much heat resistant and not much durable, and its crystallization rate is low. Thus, its use has been largely limited.

To compensate for the disadvantage of polylactic acid, a polylactic acid stereocomplex is expected to be used. The polylactic acid stereocomplex can be formed by mixing optically-active poly-L-lactic acid and optically-active poly-D-lactic acid. The melting point of a polylactic acid stereocomplex is 220° C., that is, the melting point is 50° C. higher than that of a polylactic acid homopolymer, which is 170° C. The polylactic acid stereocomplex is usually formed by mixing a poly-L-lactic acid solution and a poly-D-lactic acid solution, or by heat melt mixing poly-L-lactic acid and poly-D-lactic acid. However, if high molecular weight poly-L-lactic acid and high molecular weight poly-D-lactic acid are heat melt mixed, a material that is heat resistant as well as durable is difficult to be obtained because many melting point peaks derived from polylactic acid homopolymers exist even if the ratio of mixing composition is 50:50.

On the other hand, a polylactic acid block copolymer is gathering attention as a novel method of forming polylactic acid stereocomplexes. Poly-L-lactic acid segments containing L-lactic acid as a main component and poly-D-lactic acid segments containing D-lactic acid as a main component are covalent bonded to form the polylactic acid block copolymer. Although the molecular weight of the polylactic acid block copolymer is high, it well forms a stereocomplex crystalline form, and the melting point derived from stereocomplex crystals can be observed. Thus, a material, which has excellent heat resistance, crystallization properties, mechanical properties, and durability, can be obtained. Accordingly, application of the polylactic acid block copolymer to fibers, films, and resin molded articles having high melting points and excellent crystallinity has been attempted.

In the molding process of polylactic acid, the polylactic acid is heat melted at the temperature of the same as or above the melting point of the polymer, and is molded in a desired shape. However, if melting retention is conducted at a high temperature, thermal degradation may occur. The residual of a metal catalyst used to polymerize polylactic acid is the main cause of thermal degradation, and the residual of the metal catalyst facilitates a reaction for removing lactide from the end of polylactic acid, which results in decrease of a molecular weight or a gross weight. If the weight is decreased at the time of molding, the physical characteristic of the molded article is affected, and thus a catalyst deactivating agent such as a metal phosphate is added in the polymer after polymerization to reduce activity of a tin catalyst so that thermal degradation is decreased, and thermal stability is increased. As mentioned, regarding polylactic acid and polylactic acid stereocomplexes, polylactic acid resin compositions have been widely developed to improve the characteristics of molded articles (see, for example, Japanese Patent Application Laid-open No. 2003-192884, WO 2012/029393, WO 2009/119336, Japanese Patent Application Laid-open No. 2010-84266 and WO 2012/111587).

In JP '884, a polylactic acid polymer composition, in which a metal phosphate ester is added as a nuclear agent to a polylactic acid stereocomplex including poly-L-lactic acid and poly-D-lactic acid, is disclosed. The metal phosphate ester is an aromatic metal organophosphate ester containing an alkali metal atom or an alkaline earth metal atom. A polylactic acid polymer composition containing the aromatic metal organophosphate ester has a higher cooling crystallization temperature and an excellent crystallization characteristic, and thus good molding in a metal mold can be expected. However, although a melting point and a crystallization characteristic are improved by using the polylactic acid stereocomplex, the metal organophosphate ester used as the resin composition is less effective in deactivating a tin compound contained in the polylactic acid. Thus, thermal degradation occurs at the time of heating, and the weight is decreased. As a result, mechanical properties after molding may be reduced, and durability may be affected.

In WO '393, a polylactic acid block copolymer including poly-L-lactic acid segments containing L-lactic acid as a main component and poly-D-lactic acid segments containing D-lactic acid as a main component is disclosed. In this art, since poly-L-lactic acid segments containing L-lactic acid as a main component and poly-D-lactic acid segments containing D-lactic acid as a main component are covalent bonded, stereocomplex crystals can be formed even if the molecular weight of the polylactic acid block copolymer is high, and the heat resistance and the crystallization properties of the polylactic acid block copolymer are excellent compared to those of homopolylactic acid. The compound used as a catalyst deactivating agent in this art is a phosphate compound or a phosphite compound. If these compounds are contained in the polylactic acid block copolymer, thermal degradation upon heating is suppressed, and thermal stability is increased. However, the problem is that, since a cooling crystallization temperature is lowered and enthalpy of crystallization is decreased, the crystallization properties are also decreased.

On the other hand, to improve the hydrolysis resistance, suppress the thermal degradation, and improve the thermal stability of a polylactic acid resin, the art in which an alkali metal phosphate represented by sodium dihydrogen phosphate is mixed is disclosed (WO '336, JP '266 and WO '587). This is different from an organic phosphoric acid compound used in JP '884 and WO '393.

In WO '336, the hydrolysis resistance of a polylactic acid resin is improved by adding an alkali metal phosphate to a polylactic acid resin. In this art, since the alkali metal phosphate captures a hydrogen ion derived from a carboxy group existed on the end of polylactic acid, a buffer effect prevents pH to be varied even if some hydrogen ions are generated from the carboxy group existed on the end of polylactic acid, and thereby improves a hydrolysis resistance.

In JP '266, a dihydrogenphosphate of an alkali metal and a carboxy group reactive end-capping agent are mixed in a polylactic acid resin to improve a hydrolysis resistance. Similarly to WO '336, the dihydrogenphosphate of an alkali metal used in this art captures a hydrogen ion released from an end carboxy group so that the hydrolysis resistance is improved. Moreover, in JP '266, since the carboxyl end-capping agent reacts with the carboxy group of polylactic acid, the hydrolysis resistance is further improved.

In WO '587, a thermoplastic resin composition, in which sodium dihydrogen phosphate is mixed in a resin composition including a styrene resin, a graft copolymer, and an aliphatic polyester represented by a polylactic acid resin, is disclosed. In the thermoplastic resin composition disclosed in WO '587, a styrene resin represented by an ABS resin and a graft copolymer are mixed in the polylactic acid resin. Accordingly, the impact resistance of the polylactic acid resin, which is a problem to be solved, is improved. Moreover, by containing phosphoric acid and/or sodium dihydrogen phosphate, alkalinolysis of an aliphatic polyester resin is prevented to improve thermal stability, as well as to suppress irritating smell generated at the time of molding.

As for WO '336, JP '266 and WO '587, although the hydrolysis resistance and heat resistance of a polylactic acid resin are improved, the crystallization rate of polylactic acid is hardly improved, and thus productivity is still the problem. In addition, since the melting point of homopolylactic acid is around 170° C., the heat resistance is also the problem for practical uses.

As mentioned above, either the heat resistance or the crystallization properties can be improved by adding a phosphorous-based compound to a polylactic acid or a polylactic acid stereocomplex to obtain a polylactic acid resin composition. However, the polylactic acid resin composition satisfying both of the heat resistance and the crystallization properties has not been obtained.

It could therefore be helpful to provide a polylactic acid resin composition for forming a polylactic acid stereocomplex, which has excellent heat resistance, crystallization properties, mechanical properties, and durability, a molded product, and a method of manufacturing polylactic acid resin compositions. In particular, it could be helpful to provide a polylactic acid resin keeping excellent crystallization properties after deactivating a catalyst, and satisfying both of the heat resistance and the crystallization properties.

SUMMARY

We thus provide:
a polylactic acid resin composition including 0.005 parts by weight to 1.2 parts by weight of a metal phosphate represented by Formula (1):

$$M_xH_yPO_z \tag{1}$$

(in Formula (1), M is an alkali metal atom or an alkaline earth metal atom, and x, y, and z are integers satisfying $1 \leq x \leq 2$, $1 \leq y \leq 4$, and $2 \leq z \leq 8$, respectively)
with respect to 100 parts by weight of a polylactic acid resin including a poly-L-lactic acid component and a poly-D-lactic acid component, wherein a crystallization enthalpy of crystals in the polylactic acid resin is not less than 5 J/g when a temperature of the polylactic acid resin composition is increased to 250° C., and the temperature is kept constant for 3 minutes, followed by decreasing the temperature at a cooling rate of 20° C./min in differential scanning calorimetry.

Moreover, in the polylactic acid resin composition, the polylactic acid resin includes a polylactic acid block copolymer composed of a poly-L-lactic acid segments containing L-lactic acid as a main component, and a poly-D-lactic acid segments containing D-lactic acid as a main component.

Moreover, in the polylactic acid resin composition, the polylactic acid resin is a polylactic acid stereocomplex that is obtained by mixing poly-L-lactic acid and poly-D-lactic acid and in which a degree of stereocomplexation (Sc) satisfies Equation (2):

$$Sc = \Delta Hh/(\Delta Hl + \Delta Hh) \times 100 \geq 80 \tag{2}$$

where
ΔHh represents heat of fusion of stereocomplex crystals (J/g) by increasing a temperature at a heating rate of 20° C./min in differential scanning calorimetry, and
ΔHl represents heat of fusion of crystals (J/g) of poly-L-lactic acid alone or crystals (J/g) of poly-D-lactic acid alone by increasing a temperature at a heating rate of 20° C./min in differential scanning calorimetry.

Moreover, in the polylactic acid resin composition, the metal phosphate is at least one selected from sodium dihydrogen phosphate, potassium dihydrogen phosphate, lithium dihydrogen phosphate, calcium dihydrogen phosphate, disodium hydrogen phosphate, dipotassium hydrogen phosphate, calcium hydrogen phosphate, barium hydrogen phosphate, magnesium hydrogen phosphate, sodium hydrogen phosphite, potassium phosphite, calcium hydrogen phosphite, sodium hypophosphite, potassium hypophosphite, and calcium hypophosphite.

Moreover, in the polylactic acid resin composition, the polylactic acid resin is obtained by adding 0.01 parts by weight to 20 parts by weight of a polyfunctional compound with respect to 100 parts by weight of the polylactic acid resin.

Moreover, in the polylactic acid resin composition, the polyfunctional compound is at least one selected from polycarboxylic acid anhydrides, polyisocyanates, polyalcohols, and polyepoxy compounds.

Moreover, in the polylactic acid resin composition, a weight loss percentage after the polylactic acid resin composition is heated at 240° C. for 30 minutes in a thermogravimetric analysis is less than 1.0%.

Moreover, in the polylactic acid resin composition, the polylactic acid block copolymer is obtained by mixing poly-L-lactic acid and poly-D-lactic acid under a condition of a combination 1 and/or a combination 2:

a combination 1, in which one of the poly-L-lactic acid and the poly-D-lactic acid has a weight average molecular weight of not less than 60,000 and not more than 300,000, and the other has a weight average molecular weight of not less than 10,000 and not more than 100,000, and/or a combination 2, in which a ratio between the weight average molecular weight of the poly-L-lactic acid and the weight average molecular weight of the poly-D-lactic acid is not less than 2 and less than 30, to obtain a mixture in which Sc satisfies Equation (3):

$$Sc=\Delta Hh/(\Delta Hl+\Delta Hh)\times 100>60 \qquad (3)$$

where $\Delta Hh$ represents heat of fusion of stereocomplex crystals (J/g) by increasing a temperature at a heating rate of 20° C./min in differential scanning calorimetry, and $\Delta Hl$ represents heat of fusion of crystals (J/g) of poly-L-lactic acid alone or crystals (J/g) of poly-D-lactic acid alone by increasing a temperature at a heating rate of 20° C./min in differential scanning calorimetry, and that has a weight average molecular weight of not less than 90,000, followed by solid-state polymerization of the mixture at a temperature lower than a melting point of the mixture.

Moreover, in the polylactic acid resin composition, the polylactic acid block copolymer is obtained by mixing poly-L-lactic acid and poly-D-lactic acid under a condition of a combination 3 and/or a combination 4:

a combination 3, in which one of the poly-L-lactic acid and the poly-D-lactic acid has a weight average molecular weight of not less than 60,000 and not more than 300,000, and the other has a weight average molecular weight of not less than 10,000 and not more than 50,000, and/or a combination 4, in which a ratio between the weight average molecular weight of the poly-L-lactic acid and the weight average molecular weight of the poly-D-lactic acid is not less than 2 and less than 30, to obtain a mixture in which Sc satisfies Equation (3):

$$Sc=\Delta Hh/(\Delta Hl+\Delta Hh)\times 100>60 \qquad (3)$$

where $\Delta Hh$ represents heat of fusion of stereocomplex crystals (J/g) by increasing a temperature at a heating rate of 20° C./min in differential scanning calorimetry, and $\Delta Hl$ represents heat of fusion of crystals (J/g) of poly-L-lactic acid alone or crystals (J/g) of poly-D-lactic acid alone by increasing a temperature at a heating rate of 20° C./min in differential scanning calorimetry, and that has a weight average molecular weight of not less than 90,000, followed by solid-state polymerization of the mixture at a temperature lower than a melting point of the mixture.

Moreover, in the polylactic acid resin composition, the polylactic acid block copolymer satisfies Equation (4):

$$1<(Tm-Tms)/(Tme-Tm)<1.8 \qquad (4)$$

where

Tm refers to a melting point attributed to stereocomplex crystals observed within a temperature range of not less than 190° C. and less than 250° C. when a temperature was increased at a heating rate of 40° C./min in differential scanning calorimetry, Tms refers to a start of melting point derived from stereocomplex crystals observed within the temperature range of not less than 190° C. and less than 250° C. when the temperature was increased at a heating rate of 40° C./min in differential scanning calorimetry, and Tme refers to an end of melting point of stereocomplex crystals observed within the temperature range of not less than 190° C. and less than 250° C. when the temperature was increased at a heating rate of 40° C./min in differential scanning calorimetry.

Moreover, in the polylactic acid resin composition, the polylactic acid stereocomplex is obtained by mixing poly-L-lactic acid and poly-D-lactic acid under a condition of a combination 5 and/or a combination 6:

a combination 5, in which one of the poly-L-lactic acid and the poly-D-lactic acid has a weight average molecular weight of not less than 60,000 and not more than 300,000, and the other has a weight average molecular weight of not less than 10,000 and not more than 100,000, and/or a combination 6, in which a ratio between the weight average molecular weight of the poly-L-lactic acid and the weight average molecular weight of the poly-D-lactic acid is not less than 2 and less than 30, in which a weight average molecular weight of the mixture is not less than 90,000.

Moreover, in the polylactic acid resin composition, the polylactic acid stereocomplex is obtained by mixing poly-L-lactic acid and poly-D-lactic acid under a condition of a combination 7 and/or a combination 8:

a combination 7, in which one of the poly-L-lactic acid and the poly-D-lactic acid has a weight average molecular weight of not less than 60,000 and not more than 300,000, and the other has a weight average molecular weight of not less than 10,000 and not more than 50,000, and/or a combination 8, in which a ratio between the weight average molecular weight of the poly-L-lactic acid and the weight average molecular weight of the poly-D-lactic acid is not less than 2 and less than 30, in which a weight average molecular weight of the mixture is not less than 90,000.

Moreover, in the polylactic acid resin composition, a weight average molecular weight of the polylactic acid resin is not less than 100,000 and not more than 300,000.

Moreover, a molded product is made from the polylactic acid resin composition according to this disclosure.

Moreover, a method of manufacturing the polylactic acid resin composition includes: obtaining the polylactic acid block copolymer; and melt mixing the metal phosphate.

Moreover, a method of manufacturing the polylactic acid resin composition includes: obtaining the polylactic acid stereocomplex; and melt mixing the metal phosphate.

A polylactic acid resin composition, which has excellent heat resistance, crystallization properties, mechanical properties, and durability can be provided. Because the polylactic acid resin composition contains a metal phosphate as a catalyst deactivating agent, not only the catalyst deactivating effect of the polylactic acid resin composition improves the heat resistance, but also excellent crystallinity after deactivating the catalyst can be kept.

DETAILED DESCRIPTION

Hereinafter, examples of performing our methods will be explained in detail. Note that this disclosure is not limited to the examples described below.

Hereinafter, our compositions, products and methods will be explained in detail. A polylactic acid resin composition includes 0.005 parts by weight to 1.2 parts by weight of a metal phosphate with respect to 100 parts by weight of a polylactic acid resin including a poly-L-lactic acid component and a poly-D-lactic acid component.

Poly-L-Lactic Acid Component and Poly-D-Lactic Acid Component

The polylactic acid resin refers to a polylactic acid resin composed of a poly-L-lactic acid component and a poly-D-lactic acid component.

The poly-L-lactic acid herein refers to a polymer containing L-lactic acid as a major component and containing not less than 70% by mole L-lactic acid units. The poly-L-lactic acid includes preferably not less than 80% by mole, more preferably not less than 90% by mole, still more preferably not less than 95% by mole, especially preferably not less than 98% by mole L-lactic acid units.

The poly-D-lactic acid herein refers to a polymer containing D-lactic acid as a major component and containing not less than 70% by mole D-lactic acid units. The poly-D-lactic acid includes preferably not less than 80% by mole, more preferably not less than 90% by mole, still more preferably not less than 95% by mole, especially preferably not less than 98% by mole D-lactic acid units.

Poly-L-lactic acid composed of L-lactic acid units or poly-D-lactic acid composed of D-lactic acid units may include other component units as long as the performance of the obtained polylactic acid resin composition is not adversely affected. Examples of the component units other than L-lactic acid and D-lactic acid units include polycarboxylic acid, polyalcohol, hydroxycarboxylic acid and lactone, and specific examples of the component units include: polycarboxylic acids such as succinic acid, adipic acid, sebacic acid, fumaric acid, terephthalic acid, isophthalic acid, 2,6-naphthalenedicarboxylic acid, 5-sodium sulfoisophthalic acid, 5-tetrabutylphosphonium sulfoisophthalic acid, and derivatives thereof; polyalcohols such as ethylene glycol, propylene glycol, butanediol, pentanediol, hexanediol, octanediol, neopentyl glycol, glycerin, trimethylolpropane, pentaerythritol, polyalcohol prepared by addition of ethylene oxide or propylene oxide to trimethylolpropane or pentaerythritol, aromatic polyalcohol prepared by addition reaction of bisphenol with ethylene oxide, diethylene glycol, triethylene glycol, polyethylene glycol and polypropylene glycol, and derivatives thereof; hydroxycarboxylic acids such as glycolic acid, 3-hydroxybutyric acid, 4-hydroxybutyric acid, 4-hydroxyvaleric acid and 6-hydroxycaproic acid; and lactones such as glycolide, ε-caprolactone glycolide, ε-caprolactone, β-propiolactone, δ-butyrolactone, β- or δ-butyrolactone, pivalolactone and δ-valerolactone.

Although the weight average molecular weight of the poly-L-lactic acid and poly-D-lactic acid is not particularly limited, preferably one of the poly-L-lactic acid and poly-D-lactic acid has a weight average molecular weight of not less than 60,000 and not more than 300,000, and the other has a weight average molecular weight of not less than 10,000 and not more than 50,000. More preferably, one of the polylactic acids has a weight average molecular weight of not less than 100,000 and not more than 270,000, and the other has a weight average molecular weight of not less than 20,000 and not more than 45,000. Especially preferably, one of the polylactic acids has a weight average molecular weight of not less than 150,000 and not more than 240,000, and the other has a weight average molecular weight of not less than 30,000 and not more than 45,000.

In another preferred aspect regarding the weight average molecular weight of the poly-L-lactic acid and poly-D-lactic acid, one of the poly-L-lactic acid and poly-D-lactic acid has a weight average molecular weight of not less than 60,000 and not more than 300,000, and the other has a weight average molecular weight of not less than 10,000 and not more than 100,000. Preferably, one of the polylactic acids has a weight average molecular weight of not less than 100,000 and not more than 270,000, and the other has a weight average molecular weight of not less than 20,000 and not more than 80,000. More preferably, one of the polylactic acids has a weight average molecular weight of not less than 125,000 and not more than 255,000, and the other has a weight average molecular weight of not less than 25,000 and not more than 65,000. Especially preferably, one of the polylactic acids has a weight average molecular weight of not less than 150,000 and not more than 240,000, and the other has a weight average molecular weight of not less than 30,000 and not more than 45,000.

In the poly-L-lactic acid and poly-D-lactic acid, the ratio of the polylactic acid having a higher weight average molecular weight with respect to the polylactic acid having a lower average molecular weight is preferably not less than 2 and less than 30. The ratio is more preferably not less than 3 and less than 20, most preferably not less than 5 and less than 15. The combination of the weight average molecular weights of the poly-L-lactic acid and poly-D-lactic acid is preferably appropriately selected such that the weight average molecular weight after mixing is not less than 90,000.

The poly-L-lactic acid and poly-D-lactic acid preferably satisfy that the weight average molecular weight of each of the poly-L-lactic acid component and the poly-D-lactic acid component is within the above-described range, and that a ratio between the weight average molecular weight of the poly-L-lactic acid component and the weight average molecular weight of the poly-D-lactic acid component is not less than 2 and less than 30.

The weight average molecular weight herein refers to a value measured by gel permeation chromatography (GPC) using hexafluoroisopropanol or chloroform as a solvent and calculated in terms of a poly(methyl methacrylate) standard.

Each of the amount of lactide and the amount of oligomers contained in each of poly-L-lactic acid and poly-D-lactic acid is preferably not more than 5%. The amount is more preferably not more than 3%, especially preferably not more than 1%. The amount of lactic acid contained in the poly-L-lactic acid or poly-D-lactic acid is preferably not more than 2%. The amount is more preferably not more than 1%, especially preferably not more than 0.5%.

In terms of the acid values of the poly-L-lactic acid and poly-D-lactic acid, the acid value of one of the poly-L-lactic acid and poly-D-lactic acid is preferably not more than 100 eq/ton. The value is more preferably not more than 50 eq/ton, still more preferably not more than 30 eq/ton, especially preferably not more than 15 eq/ton. The acid value of the other of the poly-L-lactic acid and poly-D-lactic acid to be mixed is preferably not more than 600 eq/ton. The value is more preferably not more than 300 eq/ton, still more preferably not more than 150 eq/ton, especially preferably not more than 100 eq/ton.

The method of producing poly-L-lactic acid or poly-D-lactic acid is not limited, and conventional methods for production of polylactic acid may be used. More particularly, known examples of the method include the two-step lactide method in which cyclic dimer L-lactide or D-lactide is once produced using L-lactic acid or D-lactic acid as a raw material and ring-opening polymerization is then carried out, and the one-step direct polymerization method in which the raw material is directly subjected to dehydration condensation in a solvent or without any solvent. Any of the production methods may be used.

In the method in which the ring-opening polymerization method is used to produce poly-L-lactic acid or poly-D-lactic acid, the amount of water in the reaction system is preferably not more than 4% by mole with respect to the total amount of L-lactide and D-lactide in view of obtaining a high molecular weight product. The amount of water is more preferably not more than 2% by mole, especially preferably not more than 0.5% by mole. Note that the amount of water is a value measured by coulometric titration using the Karl-Fischer method.

Examples of the polymerization catalyst used for production of poly-L-lactic acid or poly-D-lactic acid by the ring-opening polymerization method include metal catalysts and acid catalysts. Examples of the metal catalysts include tin compounds, titanium compounds, lead compounds, zinc compounds, cobalt compounds, iron compounds, lithium compounds and rare earth compounds. Preferred examples of the types of the compounds include metal alkoxides, halogen metal compounds, organic carboxylates, carbonates, sulfates and oxides. Specific examples of the tin compounds include tin powder, tin(II) chloride, tin(IV) chloride, tin(II) bromide, tin(IV) bromide, ethoxytin(II), t-butoxytin(IV), isopropoxytin(IV), stannous acetate, tin (IV) acetate, stannous octoate, tin(II) laurate, tin(II) myristate, tin(II) palmitate, tin(II) stearate, tin(II) oleate, tin(II) linoleate, tin(II) acetylacetonate, tin(II) oxalate, tin(II) lactate, tin(II) tartrate, tin(II) pyrophosphate, tin(II) p-phenolsulfonate, tin(II) bis(methanesulfonate), tin(II) sulfate, tin(II) oxide, tin(IV) oxide, tin(II) sulfide, tin(IV) sulfide, dimethyltin(IV) oxide, methylphenyltin(IV) oxide, dibutyltin(IV) oxide, dioctyltin(IV) oxide, diphenyltin(IV) oxide, tributyltin oxide, triethyltin(IV) hydroxide, triphenyltin(IV) hydroxide, tributyltin hydride, monobutyltin(IV) oxide, tetramethyltin(IV), tetraethyltin(IV), tetrabutyltin(IV), dibutyldiphenyltin(IV), tetraphenyltin(IV), tributyltin(IV) acetate, triisobutyltin(IV) acetate, triphenyltin(IV) acetate, dibutyltin diacetate, dibutyltin dioctoate, dibutyltin(IV) dilaurate, dibutyltin(IV) maleate, dibutyltin bis(acetylacetonate), tributyltin(IV) chloride, dibutyltin dichloride, monobutyltin trichloride, dioctyltin dichloride, triphenyltin (IV) chloride, tributyltin sulfide, tributyltin sulfate, tin(II) methanesulfonate, tin(II) ethanesulfonate, tin(II) trifluoromethanesulfonate, ammonium hexachlorostannate(IV), dibutyltin sulfide, diphenyltin sulfide, triethyltin sulfate and tin(II) phthalocyanine Specific examples of the titanium compounds include titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate and titanium(IV) oxide. Specific examples of the lead compounds include diisopropoxylead(II), lead monochloride, lead acetate, lead(II) octoate, lead(II) isooctoate, lead(II) isononanoate, lead(II) laurate, lead(II) oleate, lead (II) linoleate, lead naphthenate, lead(II) neodecanoate, lead oxide and lead(II) sulfate. Specific examples of the zinc compounds include zinc powder, methylpropoxy zinc, zinc chloride, zinc acetate, zinc(II) octoate, zinc naphthenate, zinc carbonate, zinc oxide and zinc sulfate. Specific examples of the cobalt compounds include cobalt chloride, cobalt acetate, cobalt(II) octoate, cobalt(II) isooctoate, cobalt(II) isononanoate, cobalt(II) laurate, cobalt(II) oleate, cobalt(II) linoleate, cobalt naphthenate, cobalt(II) neodecanoate, cobalt(II) carbonate, cobalt(II) sulfate and cobalt (II) oxide. Specific examples of the iron compounds include iron(II) chloride, iron(II) acetate, iron(II) octoate, iron naphthenate, iron(II) carbonate, iron(II) sulfate and iron(II) oxide. Specific examples of the lithium compounds include lithium propoxide, lithium chloride, lithium acetate, lithium octoate, lithium naphthenate, lithium carbonate, dilithium sulfate and lithium oxide. Specific examples of the rare earth compounds include triisopropoxyeuropium(III), triisopropoxyneodymium(III), triisopropoxylanthanum, triisopropoxysamarium(III), triisopropoxyyttrium, isopropoxyyttrium, dysprosium chloride, europium chloride, lanthanum chloride, neodymium chloride, samarium chloride, yttrium chloride, dysprosium(III) triacetate, europium(III) triacetate, lanthanum acetate, neodymium triacetate, samarium acetate, yttrium triacetate, dysprosium(III) carbonate, dysprosium (IV) carbonate, europium(II) carbonate, lanthanum carbonate, neodymium carbonate, samarium(II) carbonate, samarium(III) carbonate, yttrium carbonate, dysprosium sulfate, europium(II) sulfate, lanthanum sulfate, neodymium sulfate, samarium sulfate, yttrium sulfate, europium dioxide, lanthanum oxide, neodymium oxide, samarium(III) oxide and yttrium oxide. Other examples of the metal catalysts include potassium compounds such as potassium isopropoxide, potassium chloride, potassium acetate, potassium octoate, potassium naphthenate, potassium t-butyl carbonate, potassium sulfate and potassium oxide; copper compounds such as copper(II) diisopropoxide, copper(II) chloride, copper(II) acetate, copper octoate, copper naphthenate, copper(II) sulfate and dicopper carbonate; nickel compounds such as nickel chloride, nickel acetate, nickel octoate, nickel carbonate, nickel(II) sulfate and nickel oxide; zirconium compounds such as tetraisopropoxyzirconium(IV), zirconium trichloride, zirconium acetate, zirconium octoate, zirconium naphthenate, zirconium(II) carbonate, zirconium(IV) carbonate, zirconium sulfate and zirconium(II) oxide; antimony compounds such as triisopropoxyantimony, antimony(III) fluoride, antimony(V) fluoride, antimony acetate and antimony(III) oxide; magnesium compounds such as magnesium, magnesium diisopropoxide, magnesium chloride, magnesium acetate, magnesium lactate, magnesium carbonate, magnesium sulfate and magnesium oxide; calcium compounds such as diisopropoxycalcium, calcium chloride, calcium acetate, calcium octoate, calcium naphthenate, calcium lactate and calcium sulfate; aluminum compounds such as aluminum, aluminum isopropoxide, aluminum chloride, aluminum acetate, aluminum octoate, aluminum sulfate and aluminum oxide; germanium compounds such as germanium, tetraisopropoxygermane and germanium(IV) oxide; manganese compounds such as triisopropoxymanganese(III), manganese trichloride, manganese acetate, manganese(II) octoate, manganese(II) naphthenate and manganese(II) sulfate; and bismuth compounds such as bismuth (III) chloride, bismuth powder, bismuth(III) oxide, bismuth acetate, bismuth octoate and bismuth neodecanoate. Still other preferred examples of the metal catalysts include compounds composed of two or more kinds of metallic elements such as sodium stannate, magnesium stannate, potassium stannate, calcium stannate, manganese stannate, bismuth stannate, barium stannate, strontium stannate, sodium titanate, magnesium titanate, aluminum titanate, potassium titanate, calcium titanate, cobalt titanate, zinc titanate, manganese titanate, zirconium titanate, bismuth titanate, barium titanate and strontium titanate.

The acid catalyst may be either a Brønsted acid as a proton donor or a Lewis acid as an electron-pair acceptor, and may be either an organic acid or an inorganic acid. Specific examples of the acid catalyst include monocarboxylic acid compounds such as formic acid, acetic acid, propionic acid, heptanoic acid, octanoic acid, octylic acid, nonanoic acid, isononanoic acid, trifluoroacetic acid and trichloroacetic acid; dicarboxylic acid compounds such as oxalic acid, succinic acid, maleic acid, tartaric acid and malonic acid; tricarboxylic acid compounds such as citric acid and tricarballylic acid; sulfonic acid compounds such as aromatic sulfonic acids including benzenesulfonic acid, n-butylbenzenesulfonic acid, n-octylbenzenesulfonic acid, n-dodecylbenzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino 4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, p-chlorobenzenesulfonic acid, 2,5-dichlorobenzenesulfonic acid, p-phenolsulfonic acid, cumene sulfonic acid, xylenesulfonic acid, o-cresolsulfonic acid, m-cresolsulfonic acid, p-cresolsulfonic acid, p-toluenesulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, dinonylnaphthalenedisulfonic acid, 1,5-naphthalenedisulfonic acid, 2,7-naphthalenedisulfonic acid, 4,4-biphenyldisulfonic acid, anthraquinone-2-sulfonic acid, m-benzenedisulfonic acid, 2,5-diamino-1,3-benzenedisulfonic acid, aniline-2,4-disulfonic acid, anthraquinone-1,5-disulfonic acid and polystyrene sulfonic acid, aliphatic sulfonic acids including methanesulfonic acid, ethanesulfonic acid, 1-propanesulfonic acid, n-octylsulfonic acid, pentadecylsulfonic acid, trifluoromethanesulfonic acid, trichloromethanesulfonic acid, 1,2-ethanedisulfonic acid, 1,3-propanedisulfonic acid, aminomethanesulfonic acid and 2-aminoethanesulfonic acid, alicyclic sulfonic acids including cyclopentanesulfonic acid, cyclohexanesulfonic acid, camphorsulfonic acid and 3-cyclohexylaminopropanesulfonic acid; acidic amino acids such as aspartic acid and glutamic acid; ascorbic acid; retinoic acid; phosphoric acid compounds such as phosphoric acid, metaphosphoric acid, phosphorus acid, hypophosphorous acid, polyphosphoric acid, phosphoric acid monoesters including monododecyl phosphate and monooctadecyl phosphate, phosphoric acid diesters including didodecyl phosphate and dioctadecyl phosphate, phosphorus acid monoesters and phosphorus acid diesters; boric acid; hydrochloric acid; and sulfuric acid. The form of the acid catalyst is not limited, and may be either a solid acid catalyst or a liquid acid catalyst. Examples of the solid acid catalyst include natural minerals such as acid clay, kaolinite, bentonite, montmorillonite, talc, zirconium silicate and zeolite; oxides such as silica, alumina, titania and zirconia; oxide complexes such as silica alumina, silica magnesia, silica boria, alumina boria, silica titania and silica zirconia; chlorinated alumina; fluorinated alumina; and positive ion exchange resins.

The amount of the polymerization catalyst to be added for the ring-opening polymerization is not limited, and preferably not less than 0.001 parts by weight and not more than 2 parts by weight, especially preferably not less than 0.001 parts by weight and not more than 1 part by weight with respect to 100 parts by weight of the raw materials used (L-lactic acid, D-lactic acid and/or the like). When the amount of catalyst is within the above-described preferred range, the effect of reducing the polymerization time can be obtained, and the molecular weight of the polylactic acid block copolymer finally obtained tends to be high. Further, when two or more types of catalysts are used in combination, the total amount of the catalysts added is preferably within the above-described range.

The timing of addition of the polymerization catalyst in the ring-opening polymerization is not limited, and the catalyst is preferably added after melting of the lactide under heat in view of uniform dispersion of the catalyst in the system and enhancement of the polymerization activity.

Examples of the preferable polymerization catalyst used for production of poly-L-lactic acid or poly-D-lactic acid by the direct polymerization method include metal catalysts and acid catalysts. As the polymerization catalyst, the catalysts described as polymerization catalysts used for production of poly-L-lactic acid or poly-D-lactic acid by the ring-opening polymerization method can be used.

In consideration of the molecular weight of the produced polylactic acid, tin compounds, titanium compounds, antimony compounds, rare earth compounds and acid catalysts are preferred. In view of the melting point of the produced polylactic acid, tin compounds, titanium compounds and sulfonic acid compounds are more preferred. Further, in view of the thermal stability of the produced polylactic acid, in the case of a metal catalyst, tin-based organic carboxylates and tin-based halogen compounds are preferred, and stannous acetate, stannous octoate and tin(II) chloride are more preferred; and, in the case of an acid catalyst, mono- and disulfonic acid compounds are preferred, and methanesulfonic acid, ethanesulfonic acid, propanesulfonic acid, propanedisulfonic acid, naphthalenedisulfonic acid and 2-aminoethanesulfonic acid are more preferred. The catalyst may be of a single type, or two or more types of catalysts may be used in combination. In view of enhancement of the polymerization activity, two or more types of catalysts are preferably used in combination. In view of also allowing suppression of coloring, one or more selected from tin compounds and/or one or more selected from sulfonic acid compounds is/are preferably used. In view of achievement of excellent productivity, it is preferred to employ stannous acetate and/or stannous octoate in combination with any one or more of methanesulfonic acid, ethanesulfonic acid, propanedisulfonic acid, naphthalenedisulfonic acid and 2-aminoethanesulfonic acid, and it is more preferred to employ stannous acetate and/or stannous octoate in combination with any one of methanesulfonic acid, ethanesulfonic acid, propanedisulfonic acid and 2-aminoethanesulfonic acid.

The amount of polymerization catalyst to be added is not limited, and preferably not less than 0.001 parts by weight and not more than 2 parts by weight, especially preferably not less than 0.001 parts by weight and not more than 1 part by weight with respect to 100 parts by weight of the raw materials used (L-lactic acid, D-lactic acid and/or the like). When the amount of catalyst is less than 0.001 parts by weight, the effect of reducing the polymerization time is lowered, and when the amount of catalyst is more than 2 parts by weight, the molecular weight of the polylactic acid block copolymer finally obtained does not tend to be high. Further, when two or more types of catalysts are used in combination, the total amount of the catalysts added is preferably within the above-described range. When one or more types selected from tin compounds and/or one or more types selected from sulfonic acid compounds are used in combination, the weight ratio between the tin compound(s) and the sulfonic acid compound(s) is preferably 1:1 to 1:30 in view of allowing maintenance of high polymerization activity and suppression of coloring. In view of achievement of excellent productivity, the weight ratio between the tin compound(s) and the sulfonic acid compound(s) is more preferably 1:2 to 1:15.

The timing of addition of the polymerization catalyst is not limited, and, especially when the polylactic acid is polymerized by the direct polymerization method, an acid catalyst is preferably added to the raw material or before dehydration of the raw material in view of achievement of excellent productivity. A metal catalyst is preferably added after dehydration of the raw material in view of increasing the polymerization activity.

When solid-state polymerization is performed after direct polymerization to increase molecular weight, the forms of poly-L-lactic acid and poly-D-lactic acid is not limited, and the mixture may be in the form of a block(s), film(s), pellet(s), powder or the like. In view of efficient promotion of the solid-state polymerization, a pellet(s) or powder is/are preferably used. Examples of the method of forming the poly-L-lactic acid and poly-D-lactic acid into a pellet(s) include a method in which the mixture is extruded into a strand-like shape and pelletized, and a method in which the mixture is extruded into water and pelletized using an underwater cutter. Examples of the method of forming the poly-L-lactic acid and poly-D-lactic acid into powder include a method in which the mixture is pulverized using a pulverizer such as a mixer, blender, ball mill or hammer mill. The method of carrying out the solid-state polymerization step is not limited, and either a batch method or continuous method may be employed. The reactor may be a stirring-vessel-type reactor, mixer-type reactor, column reactor or the like, and two or more types of these reactors may be used in combination.

When this solid-state polymerization step is carried out, poly-L-lactic acid and poly-D-lactic acid after direct polymerization are preferably crystallized. When the poly-L-lactic acid and poly-D-lactic acid are in the crystallized state, crystallization of the poly-L-lactic acid and poly-D-lactic acid is not necessarily required for carrying out the solid-state polymerization, but performing crystallization allows further enhancement of the efficiency of solid-state polymerization.

The method of crystallization is not limited, and a known method may be employed. Examples of the method include a method by maintaining the polylactic acid at a crystallization temperature in the gas phase or liquid phase and a method by cooling and solidifying a molten mixture of poly-L-lactic acid and poly-D-lactic acid while carrying out the operation of stretching or shearing. In view of simplicity of the operation, the method by maintaining the polylactic acid at a crystallization temperature in the gas phase or liquid phase is preferred.

Although the crystallization temperature herein is not limited as long as the temperature is higher than the glass-transition temperature and lower than the melting point of the polylactic acid resin having a lower melting point selected from the poly-L-lactic acid and the poly-D-lactic acid mixed as described above, the crystallization treatment temperature is more preferably within the range of 70° C. to 90° C.

The crystallization is preferably performed under vacuum or under the flow of an inert gas such as dry nitrogen.

The crystallization period is not limited, and although the crystallization can be sufficiently achieved for 3 hours or more, a length of time is preferably 5 hours or more.

In terms of the temperature conditions of carrying out the solid-state polymerization step, a temperature of less than the melting point of the mixture of poly-L-lactic acid and poly-D-lactic acid is preferred. Specifically, the temperature is preferably not less than 100° C. and not more than 170° C., and, in view of efficiently promoting the solid-state polymerization, the temperature is more preferably not less than 110° C. and not more than 165° C., and most preferably not less than 120° C. and not more than 160° C.

To reduce the reaction time of the solid-state polymerization, the temperature is preferably increased stepwise or continuously as the reaction proceeds. The temperature conditions for increasing the temperature stepwise during the solid-state polymerization are preferably 120° C. to 130° C. for 1 hour to 15 hours in the first step, 135° C. to 145° C. for 1 hour to 15 hours in the second step, and 150° C. to 170° C. for 10 hours to 30 hours in the third step; more preferably 120° C. to 130° C. for 2 hours to 12 hours in the first step, 135° C. to 145° C. for 2 hours to 12 hours in the second step, and 150° C. to 170° C. for 10 hours to 25 hours in the third step. In terms of the temperature conditions for increasing the temperature continuously during the solid-state polymerization, the temperature is preferably increased from an initial temperature of 130° C. to 150° C. to a temperature of 150° C. to 170° C. continuously at a rate of 1 to 5° C./min. Further, combination of stepwise temperature increase and continuous temperature increase is also preferred in view of efficient promotion of the solid-state polymerization.

When the solid-state polymerization step is carried out, the step is preferably performed under vacuum or under the flow of an inert gas such as dry nitrogen. The degree of vacuum during the solid-state polymerization under vacuum is preferably not more than 150 Pa, more preferably not more than 75 Pa, especially preferably not more than 20 Pa. The flow rate during the solid-state polymerization under the flow of an inert gas is preferably 0.1 to 2,000 (mL/min.), more preferably 0.5 to 1,000 (mL/min.), especially preferably 1.0 to 500 (mL/min.), per 1 g of the mixture.

Polylactic Acid Resin

A polylactic acid resin is characterized by including a poly-L-lactic acid component and a poly-D-lactic acid component. The polylactic acid resin can be either a polylactic acid resin, which contains a polylactic acid block copolymer composed of poly-L-lactic acid segments containing L-lactic acid as a main component and poly-D-lactic acid segments containing D-lactic acid as a main component; or a polylactic acid stereocomplex, which includes a poly-L-lactic acid component and a poly-D-lactic acid component, and is obtained by mixing poly-L-lactic acid and poly-D-lactic acid.

Since stereocomplex formation allows the polylactic acid resin to have a melting point derived from stereocomplex crystals of 190 to 230° C., the polylactic acid block copolymer has higher heat resistance compared to polylactic acid homopolymers. The melting point derived from stereocomplex crystals is preferably 200° C. to 230° C., more preferably 205° C. to 230° C., especially preferably 210° C. to 230° C. In addition, there may be a small melting peak derived from crystals of poly-L-lactic acid alone and crystals of poly-D-lactic acid alone of 150° C. to 185° C.

The polylactic acid resin preferably has a degree of stereocomplexation (Sc) not less than 80% in view of the heat resistance. The degree of stereocomplexation (Sc) is more preferably within the range of 85% to 100%, especially preferably within the range of 90% to 100%. The degree of stereocomplexation herein means the ratio of stereocomplex crystals with respect to the total crystals in the polylactic acid. The degree of stereocomplexation (Sc) can be calculated from the ratio between crystals of polylactic acid alone and stereocomplex crystals measured by X-ray diffraction. However, a value calculated from heat of fusion of crystals, which is measured based on differential scanning calorimetry (DSC) by using a differential scanning calorimeter, is used. More particularly, the degree of stereocomplexation (Sc) can be calculated according to Equation (5), in which ΔHl represents the heat of fusion of the crystals of poly-L-lactic acid alone or the heat of fusion of the crystals of poly-D-lactic acid alone, and ΔHh represents the heat of fusion of the stereocomplex crystals, as measured with a differential scanning calorimeter by increasing the temperature from 30° C. to 250° C. at a heating rate of 20° C./min:

$$Sc=\Delta Hh/(\Delta Hl+\Delta Hh)\times 100 \quad (5).$$

The cooling crystallization temperature (Tc) is preferably not less than 130° C. in view of the moldability and the heat resistance of the polylactic acid resin. The cooling crystallization temperature (Tc) herein refers to the crystallization temperature derived from polylactic acid crystals measured with a differential scanning calorimeter by increasing the temperature at a heating rate of 20° C./min, from 30° C. to 250° C., and keeping the temperature constant for 3 minutes at 250° C., followed by decreasing the temperature at a cooling rate of 20° C./min. Although the cooling crystallization temperature (Tc) is not limited, it is preferably not less than 130° C., more preferably not less than 132° C., and especially preferably not less than 135° C., in view of the heat resistance and the transparency.

Although the weight average molecular weight of the polylactic acid resin is not limited, it is preferably not less than 100,000 and less than 300,000 in view of the moldability and the mechanical properties. The weight average molecular weight is more preferably not less than 120,000 and less than 280,000, still more preferably not less than 130,000 and less than 270,000, and especially preferably not less than 140,000 and less than 260,000.

The polydispersity of the polylactic acid resin is preferably 1.5 to 3.0 in view of the mechanical properties. The polydispersity is more preferably 1.8 to 2.7, and especially preferably 2.0 to 2.4 in view of the moldability and mechanical properties.

The weight average molecular weight and polydispersity are values measured by gel permeation chromatography (GPC) using hexafluoroisopropanol or chloroform as a solvent and calculated in terms of poly(methyl methacrylate) standards.

When the polylactic acid resin contains a polylactic acid block copolymer, the average sequence length of the polylactic acid block copolymer is preferably not less than 20. The average sequence length is more preferably not less than 25, and an average sequence length of not less than 30 is especially preferred in view of the mechanical properties of the molded product. The average sequence length of the polylactic acid block copolymer can be calculated by $^{13}C$-NMR measurement according to Equation (6), in which I (a) represents the integrated value of the peak at about 170.1 to 170.3 (ppm) among the peaks of carbon belonging to carbonyl carbon and I (b) represents the integrated value of the peak at about 169.8 to 170.0 (ppm):

$$\text{Average sequence length}=I(a)/I(b) \quad (6).$$

The weight ratio between the poly-L-lactic acid component and the poly-D-lactic acid component, which compose the polylactic acid resin, is preferably 90:10 to 10:90. The weight ratio is more preferably 80:20 to 20:80, especially preferably 75:25 to 60:40 or 40:60 to 25:75. When the weight ratio between the poly-L-lactic acid component and the poly-D-lactic acid component is within the above-described preferred range, a polylactic acid stereocomplex is likely to be formed, resulting in a sufficiently large increase in the melting point of the polylactic acid resin.

When the polylactic acid resin contains a polylactic acid block copolymer, the total number of the segment(s) composed of L-lactic acid units and the segment(s) composed of D-lactic acid units per one molecule of the polylactic acid block copolymer is preferably not less than 3 in view of easily forming a polylactic acid stereocomplex having a high melting point and obtaining a molded article having high heat resistance. The total number is more preferably not less than 5, especially preferably not less than 7.

When the polylactic acid resin contains a polylactic acid block copolymer, the polylactic acid block copolymer satisfies Equation (4) below as thermal properties:

$$1<(Tm-Tms)/(Tme-Tm)<1.8 \quad (4)$$

where
Tm: the melting point measured by a differential scanning calorimeter, which is derived from stereocomplex crystals observed within a temperature range of not less than 190° C. and less than 250° C. when the temperature of a polylactic acid block copolymer is increased from 30° C. to 250° C. at a heating rate of 40° C./min;
Tms: the start of melting point measured by a differential scanning calorimeter, which is of stereocomplex crystals observed within a temperature range of not less than 190° C. and less than 250° C. when the temperature of a polylactic acid block copolymer is increased from 30° C. to 250° C. at a heating rate of 40° C./min; and
Tme: the end of melting point measured by a differential scanning calorimeter, which is of stereocomplex crystals observed within a temperature range of not less than 190° C. and less than 250° C. when the temperature of a polylactic acid block copolymer is increased from 30° C. to 250° C. at a heating rate of 40° C./min. The more preferable range is $1<(Tm-Tms)/(Tme-Tm)<1.6$, and the especially preferable range is $1<(Tm-Tms)/(Tme-Tm)<1.4$.

When the polylactic acid block copolymer contained in the polylactic acid resin is within a range satisfying Equation (4), the polylactic acid block copolymer has a high melting point, an excellent heat resistance, and an excellent molding processability upon melting.

Method of Producing Polylactic Acid Block Copolymer

The method of producing a polylactic acid block copolymer is not limited, and conventional methods of producing polylactic acid may be used. Specific examples of the method include the lactide method in which either cyclic dimer L-lactide or D-lactide produced from raw material lactic acid is subjected to ring-opening polymerization in the presence of a catalyst and the lactide with the optical isomer to the polylactic acid above described is further added, followed by subjecting the resulting mixture to ring-opening polymerization, to obtain a polylactic acid block copolymer (Production Method 1); a method in which poly-L-lactic acid and poly-D-lactic acid are each polymerized by direct polymerization of the raw material or by ring-opening polymerization via lactide, and the obtained poly-L-lactic acid and poly-D-lactic acid are then mixed, followed by obtaining a polylactic acid block copolymer by solid-state polymerization (Production Method 2); a method in which poly-L-lactic acid and poly-D-lactic acid are melt mixed at a temperature of not less than the end of melting point of the component having a higher melting point for a long time to perform transesterification between the segment(s) of L-lactic acid units and the segment(s) of D-lactic acid units, to obtain a polylactic acid block copolymer (Production Method 3); and a method in which a polyfunctional compound(s) is/are mixed with poly-L-lactic acid and poly-D-lactic acid and the reaction is allowed to proceed to cause covalent bonding of poly-L-lactic acid and poly-D-lactic acid by the polyfunctional compound(s), to obtain a polylactic acid block copolymer (Production Method 4). Any of the production methods may be used, and the method by mixing poly-L-lactic acid and poly-D-lactic acid followed by solid-state polymerization is preferred since, in this method, the total number of the segment(s) composed of L-lactic acid units and segment(s) composed of D-lactic acid units contained per one molecule of the polylactic acid block copolymer is not less than 3, and a polylactic acid block copolymer having all of excellent heat resistance, crystallinity and mechanical properties can be obtained as a result.

Various methods of polymerization of polylactic acid block copolymers will now be described below in detail.

Production Method 1

Examples of the method in which a polylactic acid block copolymer is obtained by ring-opening polymerization include a method in which one of L-lactide and D-lactide is subjected to ring-opening polymerization in the presence of a catalyst, and then the lactide that is the other optical isomer is added and the mixture is subjected to ring-opening polymerization to obtain a polylactic acid block copolymer.

The ratio between the weight average molecular weight of the segment(s) composed of L-lactic acid units and the weight average molecular weight of the segment(s) composed of D-lactic acid units contained per one molecule of the polylactic acid block copolymer obtained by the ring-opening polymerization is preferably not less than 2 and less than 30 in view of the heat resistance, and the transparency of the molded product. The ratio is more preferably not less than 3 and less than 20, especially preferably not less than 5 and less than 15. The ratio between the weight average molecular weight of the segment(s) composed of L-lactic acid units and the weight average molecular weight of the segment(s) composed of D-lactic acid units can be controlled by the weight ratio between L-lactide and D-lactide used upon polymerization of the polylactic acid block copolymer.

The total number of the segment(s) composed of L-lactic acid units and segment(s) composed of D-lactic acid units contained per one molecule of the polylactic acid block copolymer obtained by the ring-opening polymerization is preferably not less than 3 in view of improvement of the heat resistance and the crystallinity. The total number is more preferably not less than 5, especially preferably not less than 7. The weight average molecular weight per segment is preferably not less than 2,000 and not more than 50,000. The weight average molecular weight per segment is more preferably not less than 4,000 and not more than 45,000, especially preferably not less than 5,000 and not more than 40,000.

The optical purity of the L-lactide and D-lactide to be used in the ring-opening polymerization is preferably not less than 90% ee in view of improvement of the crystallinity and the melting point of the polylactic acid block copolymer. The optical purity is more preferably not less than 95% ee, especially preferably not less than 98% ee.

When a polylactic acid block copolymer is obtained by the ring-opening polymerization method, the amount of water in the reaction system is preferably not more than 4% by mole with respect to the total amount of L-lactide and D-lactide in view of obtaining a high molecular weight product. The amount of water is more preferably not more than 2% by mole, especially preferably not more than 0.5% by mole. Note that the amount of water is a value measured by coulometric titration using the Karl-Fischer method.

Examples of the polymerization catalyst used for production of the polylactic acid block copolymer by the ring-opening polymerization method include metal catalysts and acid catalysts. As the polymerization catalyst, the catalysts described as polymerization catalysts used for production of poly-L-lactic acid or poly-D-lactic acid by the ring-opening polymerization method can be used.

In consideration of the molecular weight of the polylactic acid produced by the ring-opening polymerization method, the polymerization catalyst for the ring-opening polymerization method is preferably a metal catalyst, and among metal catalysts, tin compounds, titanium compounds, antimony compounds and rare earth compounds are more preferred. In consideration of the melting point of the polylactic acid produced by the ring-opening polymerization method, tin compounds and titanium compounds are more preferred. In consideration of the thermal stability of the polylactic acid produced by the ring-opening polymerization method, tin-based organic carboxylates and tin-based halogen compounds are preferred, and stannous acetate, stannous octoate and tin(II) chloride are more preferred.

The amount of the polymerization catalyst to be added for the ring-opening polymerization is not limited, and preferably not less than 0.001 parts by weight and not more than 2 parts by weight, especially preferably not less than 0.001 parts by weight and not more than 1 part by weight with respect to 100 parts by weight of the raw materials used (L-lactic acid, D-lactic acid and/or the like). When the amount of catalyst is within the above-described preferred range, the effect of reducing the polymerization time can be obtained, and the molecular weight of the polylactic acid block copolymer finally obtained tends to be high. Further, when two or more types of catalysts are used in combination, the total amount of the catalysts added is preferably within the above-described range.

The timing of addition of the polymerization catalyst in the ring-opening polymerization is not limited, and the catalyst is preferably added after melting of the lactide under heat in view of uniform dispersion of the catalyst in the system and enhancement of the polymerization activity.

Production Method 2

Next, the method in which poly-L-lactic acid and poly-D-lactic acid are mixed, followed by obtaining a polylactic acid block copolymer by solid-state polymerization will be explained. In Production Method 2, both of a ring-opening polymerization method and a direct polymerization method can be used for manufacturing poly-L-lactic acid and poly-D-lactic acid.

When a polylactic acid block copolymer is manufactured by mixing poly-L-lactic acid and poly-D-lactic acid, and then performing solid-state polymerization, preferably one of the poly-L-lactic acid and poly-D-lactic acid has a weight average molecular weight of not less than 60,000 and not more than 300,000, and the other has a weight average molecular weight of not less than 10,000 and not more than 50,000, in view of a higher weight average molecular weight and a higher degree of stereocomplexation after solid-state polymerization. More preferably, one of the polylactic acids has a weight average molecular weight of not less than 100,000 and not more than 270,000, and the other has a weight average molecular weight of not less than 15,000 and not more than 45,000. Especially preferably, one of the polylactic acids has a weight average molecular weight of not less than 150,000 and not more than 240,000, and the other has a weight average molecular weight of not less than 20,000 and not more than 40,000. The combination of the weight average molecular weights of the poly-L-lactic acid and poly-D-lactic acid is preferably appropriately selected such that the weight average molecular weight after mixing is not less than 90,000.

In another preferred aspect regarding the weight average molecular weight of the poly-L-lactic acid and poly-D-lactic acid, one of the poly-L-lactic acid and poly-D-lactic acid has a weight average molecular weight of not less than 60,000 and not more than 300,000, and the other has a weight average molecular weight of not less than 10,000 and not more than 100,000. Preferably, one of the polylactic acids has a weight average molecular weight of not less than 100,000 and not more than 270,000, and the other has a weight average molecular weight of not less than 20,000 and not more than 80,000. More preferably, one of the polylactic acids has a weight average molecular weight of not less than 125,000 and not more than 255,000, and the other has a weight average molecular weight of not less than 25,000 and not more than 65,000. Especially preferably, one of the polylactic acids has a weight average molecular weight of not less than 150,000 and not more than 240,000, and the other has a weight average molecular weight of not less than 30,000 and not more than 45,000.

In the poly-L-lactic acid and poly-D-lactic acid, the ratio of the polylactic acid having a higher weight average molecular weight with respect to the polylactic acid having a lower average molecular weight is preferably not less than 2 and less than 30. The ratio is more preferably not less than 3 and less than 20, most preferably not less than 5 and less than 15. The combination of the weight average molecular weights of the poly-L-lactic acid and poly-D-lactic acid is preferably appropriately selected such that the weight average molecular weight after mixing is not less than 90,000.

The poly-L-lactic acid and poly-D-lactic acid preferably satisfy that the weight average molecular weight of each of the poly-L-lactic acid component and the poly-D-lactic acid component is within the above-described range, and that a ratio between the weight average molecular weight of the poly-L-lactic acid component and the weight average molecular weight of the poly-D-lactic acid component is not less than 2 and less than 30.

Each of the amount of lactide and the amount of oligomers contained in each of poly-L-lactic acid and poly-D-lactic acid is preferably not more than 5%. The amount is more preferably not more than 3%, especially preferably not more than 1%. The amount of lactic acid contained in the poly-L-lactic acid or poly-D-lactic acid is preferably not more than 2%. The amount is more preferably not more than 1%, especially preferably not more than 0.5%.

In terms of the acid values of the poly-L-lactic acid and poly-D-lactic acid that are to be mixed, the acid value of one of the poly-L-lactic acid and poly-D-lactic acid is preferably not more than 100 eq/ton. The value is more preferably not more than 50 eq/ton, still more preferably not more than 30 eq/ton, and especially preferably not more than 15 eq/ton. The acid value of the other of the poly-L-lactic acid and poly-D-lactic acid to be mixed is preferably not more than 600 eq/ton. The value is more preferably not more than 300 eq/ton, still more preferably not more than 150 eq/ton, and especially preferably not more than 100 eq/ton.

In the method in which the ring-opening polymerization method is used to produce poly-L-lactic acid or poly-D-lactic acid, the amount of water in the reaction system is preferably not more than 4% by mole with respect to the total amount of L-lactide and D-lactide in view of obtaining a high molecular weight product. The amount of water is more preferably not more than 2% by mole, especially preferably not more than 0.5% by mole. Note that the amount of water is a value measured by coulometric titration using the Karl-Fischer method.

Examples of the polymerization catalyst used for production of poly-L-lactic acid or poly-D-lactic acid by the ring-opening polymerization method include the metal catalysts and the acid catalysts which are the same to those used in Production Method 1.

The amount of the polymerization catalyst to be added for the ring-opening polymerization is not limited, and preferably not less than 0.001 parts by weight and not more than 2 parts by weight, especially preferably not less than 0.001 parts by weight and not more than 1 part by weight with respect to 100 parts by weight of the raw materials used (L-lactic acid, D-lactic acid and/or the like). When the amount of catalyst is within the above-described preferred range, the effect of reducing the polymerization time can be obtained, and the molecular weight of the polylactic acid block copolymer finally obtained tends to be high. Further, when two or more types of catalysts are used in combination, the total amount of the catalysts added is preferably within the above-described range.

The timing of addition of the polymerization catalyst in the ring-opening polymerization is not limited, and the catalyst is preferably added after melting of the lactide under heat in view of uniform dispersion of the catalyst in the system and enhancement of the polymerization activity.

Examples of the polymerization catalyst used for production of poly-L-lactic acid or poly-D-lactic acid by the direct polymerization method include metal catalysts and acid catalysts. As the polymerization catalyst, the catalysts described as polymerization catalysts used for production of poly-L-lactic acid or poly-D-lactic acid by the ring-opening polymerization method can be used.

In view of the molecular weight of the polylactic acid produced by the direct polymerization method, tin compounds, titanium compounds, antimony compounds, rare earth compounds and acid catalysts are preferred. In view of the melting point of the produced polylactic acid, tin compounds, titanium compounds and sulfonic acid compounds are more preferred. Further, in view of the thermal stability of the produced polylactic acid, in the case of a metal catalyst, tin-based organic carboxylates and tin-based halogen compounds are preferred, and stannous acetate, stannous octoate and tin(II) chloride are more preferred; and, in the case of an acid catalyst, mono- and disulfonic acid compounds are preferred, and methanesulfonic acid, ethanesulfonic acid, propanesulfonic acid, propanedisulfonic acid, naphthalenedisulfonic acid and 2-aminoethanesulfonic acid are more preferred. The catalyst may be of a single type, or two or more types of catalysts may be used in combination. In view of enhancement of the polymerization activity, two or more types of catalysts are preferably used in combination. In view of also allowing suppression of coloring, one or more selected from tin compounds and/or one or more selected from sulfonic acid compounds is/are preferably used. In view of further achieving excellent productivity, it is more preferred to employ stannous acetate and/or stannous octoate in combination with any one or more of methanesulfonic acid, ethanesulfonic acid, propanedisulfonic acid, naphthalenedisulfonic acid and 2-aminoethanesulfonic acid, and it is still more preferred to employ stannous acetate and/or stannous octoate in combination with any one of methanesulfonic acid, ethanesulfonic acid, propanedisulfonic acid and 2-aminoethanesulfonic acid.

The amount of polymerization catalyst to be added is not limited. The amount is preferably not less than 0.001 parts by weight and not more than 2 parts by weight and especially preferably not less than 0.001 parts by weight and not more than 1 part by weight with respect to 100 parts by weight of the raw materials used (L-lactic acid, D-lactic acid and/or the like). When the amount of catalyst is less than 0.001 parts by weight, the effect of reducing the polymerization time is lowered, and when the amount of catalyst is more than 2 parts by weight, the molecular weight of the polylactic acid block copolymer finally obtained does not tend to be high. Furthermore, when two or more types of catalysts are used in combination, the total amount of the catalysts added is preferably within the above-described range. When one or more types selected from tin compounds and/or one or more types selected from sulfonic acid compounds are used in combination, the weight ratio between the tin compound(s) and the sulfonic acid compound(s) is preferably 1:1 to 1:30 in view of allowing maintenance of high polymerization activity and suppression of coloring. In view of achievement of excellent productivity, the weight ratio between the tin compound(s) and the sulfonic acid compound(s) is more preferably 1:2 to 1:15.

The timing of addition of the polymerization catalyst is not limited, and, especially when the polylactic acid is polymerized by the direct polymerization method, an acid catalyst is preferably added to the raw material or before dehydration of the raw material in view of achievement of excellent productivity. A metal catalyst is preferably added after dehydration of the raw material in view of increasing the polymerization activity.

When poly-L-lactic acid and poly-D-lactic acid are mixed and the resulting mixture is subjected to solid-state polymerization to obtain a polylactic acid block copolymer, it is preferred to mix poly-L-lactic acid and poly-D-lactic acid such that the degree of stereocomplexation (Sc) is within the range of over 60% immediately before the solid-state polymerization is carried out. The degree of stereocomplexation (Sc) is more preferably within the range of 70% to 99% and especially preferably within the range of 80% to 95%. Specifically, according to Equation (5) of above, the degree of stereocomplexation (Sc) satisfies Equation (3) below:

$$Sc=\Delta Hh/(\Delta Hl+\Delta Hh)\times 100>60 \qquad (3).$$

Whether the poly-L-lactic acid and poly-D-lactic acid to be used for the mixing are crystallized is not limited, poly-L-lactic acid and poly-D-lactic acid in the crystallized state may be mixed, or poly-L-lactic acid and poly-D-lactic acid in the molten state may also be mixed. When crystallization of the poly-L-lactic acid and poly-D-lactic acid to be used for the mixing is carried out, specific examples of the method thereof include a method in which the polylactic acids are maintained at a crystallization treatment temperature in the gas phase or liquid phase, a method in which poly-L-lactic acid and poly-D-lactic acid in the molten state are retained in a melting apparatus at a temperature between the melting point −50° C. and the melting point +20° C. under shearing, and a method in which poly-L-lactic acid and poly-D-lactic acid in the molten state are retained in a melting apparatus at a temperature between the melting point −50° C. and the melting point +20° C. under pressure.

Crystallization treatment temperature herein is not limited as long as the temperature is higher than the glass-transition temperature and lower than the melting point of the poly-lactic acid having a lower melting point between the poly-L-lactic acid and the poly-D-lactic acid that have been mixed as described above. The crystallization treatment temperature is more preferably between the heating crystallization temperature and the cooling crystallization temperature as measured with a differential scanning calorimeter in advance.

The crystallization in the gas phase or liquid phase may be carried out under any of the conditions of reduced, normal and increased pressures.

The crystallization period in the gas phase or liquid phase is not limited, and the crystallization can be sufficiently achieved within 3 hours, and a length of time of not more than 2 hours is also preferred.

In the above-mentioned method in which poly-L-lactic acid and poly-D-lactic acid are crystallized under shearing or pressure in a melting apparatus, the melting apparatus is not limited as long as shearing or pressurization is possible therewith. Examples of the melting apparatus that may be used include polymerization reactors, kneaders, Banbury mixer, single screw extruders, twin screw extruders and injection molding machines, and the melting apparatus is preferably a single screw extruder or twin screw extruder.

In the method in which crystallization is carried out in a melting apparatus under shearing or pressure, the crystallization treatment temperature is preferably between the melting point −50° C. and the melting point +20° C. according to the melting point of the poly-L-lactic acid and poly-D-lactic acid to be mixed. The crystallization temperature is more preferably between the melting point −40° C. and the melting point, especially preferably between the melting point −30° C. and the melting point −5° C. The temperature of the melting apparatus is conventionally set to a temperature of not less than the melting point +20° C. for melting the resin to allow achievement of good fluidity, but, when the temperature of the melting apparatus is set within the above-described preferred range, crystallization proceeds while appropriate fluidity is maintained, and produced crystals are unlikely to be remelted. The melting point herein means the crystal melting temperature measured by differential scanning calorimetry by increasing the temperature from 30° C. to 250° C. at a heating rate of 20° C./min.

The crystallization treatment time is preferably 0.1 minutes to 10 minutes, more preferably 0.3 to 5 minutes, and especially preferably 0.5 minutes to 3 minutes. When the crystallization treatment time is within the preferred range, crystallization sufficiently occurs, and thermal degradation is unlikely to occur.

The molecules in molten resin tend to be oriented under shearing in the melting apparatus, and this allows a significant increase in the crystallization rate as a result. The shear rate in this step is preferably 10 to 400 (/second). When the shear rate is within the preferred range, the crystallization rate is sufficiently large, and thermal degradation due to shear heating is unlikely to occur.

Crystallization tends to be promoted also under pressure, and the pressure is especially preferably 0.05 to 10 (MPa) for obtaining crystallized polylactic acid having both good fluidity and crystallinity. When the pressure is within the preferred range, the crystallization rate is sufficiently high.

Further, when the treatment is carried out under both shearing at a shear rate of 10 to 400 (/second) and a pressure of 0.05 to 10 (MPa), the crystallization rate is even higher, which is especially preferred.

The method of mixing poly-L-lactic acid and poly-D-lactic acid is not limited, and examples of the method include a method in which poly-L-lactic acid and poly-D-lactic acid are melt mixed at a temperature of not less than the end of melting point of the component having a higher melting point, a method in which mixing in a solvent is followed by removal of the solvent, and a method in which at least one of poly-L-lactic acid and poly-D-lactic acid in the molten state is retained in a melting apparatus at a temperature between the melting point −50° C. and the melting point +20° C. under shearing, followed by mixing such that crystals of the mixture composed of poly-L-lactic acid and poly-D-lactic acid remain.

The melting point herein means the temperature at the peak top of the peak due to melting of crystals of polylactic acid alone as measured with a differential scanning calorimeter, and the end of melting point means the temperature at the end of the peak due to melting of crystals of polylactic acid alone as measured with a differential scanning calorimeter.

Examples of the method in which melt mixing is performed at a temperature of not less than the end of melting point include a method in which poly-L-lactic acid and poly-D-lactic acid are mixed by a batch method or continuous method, either of which may be employed for the mixing. Examples of the kneading machine include single screw extruders, twin screw extruders, plastomill, kneaders and stirring-vessel-type reactors equipped with a pressure reducing device. In view of enabling uniform and sufficient kneading, a single screw extruder or twin screw extruder is preferably used.

In terms of the temperature conditions for melt mixing at a temperature of not less than the end of melting point, poly-L-lactic acid and poly-D-lactic acid are preferably melt mixed at a temperature of not less than the end of melting point of the component having a higher melting point. The temperature is preferably 140° C. to 250° C., more preferably 160° C. to 230° C., and especially preferably 180° C. to 210° C. When the mixing temperature is within the preferred range, the mixing can be carried out in the molten state, and the molecular weight is unlikely to decrease during the mixing. Further, the fluidity of the mixture can be kept constant and a significant decrease in the fluidity is unlikely to occur.

In terms of the time conditions for mixing, the mixing time is preferably 0.1 minutes to 10 minutes, more preferably 0.3 minutes to 5 minutes, and especially preferably 0.5 minutes to 3 minutes. When the mixing time is within the preferred range, poly-L-lactic acid and poly-D-lactic acid can be uniformly mixed, and thermal degradation due to mixing is unlikely to occur.

The pressure conditions for the mixing at a temperature of not less than the end of melting point is not limited, and the mixing may be carried out either in the air or under an atmosphere of an inert gas such as nitrogen.

Specific examples of the method of mixing poly-L-lactic acid and poly-D-lactic acid crystallized in a melting apparatus under shearing or pressure include mixing by a batch method or continuous method, and either method may be used for the mixing. The degree of stereocomplexation (Sc) of the mixture of poly-L-lactic acid and poly-D-lactic acid after mixing can be controlled by a method in which poly-L-lactic acid and poly-D-lactic acid in the molten state are retained in a melting apparatus under shearing at a temperature between the melting point −50° C. and the melting point +20° C. of the polylactic acid having a lower melting point, or by a method in which poly-L-lactic acid and poly-D-lactic acid in the molten state are retained in a melting apparatus under pressure at a temperature between the melting point −50° C. and the melting point +20° C. of the polylactic acid having a lower melting point. Note that the degree of stereocomplexation (Sc) can be calculated according to Equation (5) of above.

The temperature during mixing is preferably between the melting point −50° C. and the melting point +20° C. according to the melting point of the mixture of poly-L-lactic acid and poly-D-lactic acid. The mixing temperature is more preferably between the melting point −40° C. and the melting point, especially preferably between the melting point −30° C. and the melting point −5° C. The temperature of the melting apparatus is conventionally preferably set to a temperature of not less than the melting point +20° C. for melting the resin to allow achievement of good fluidity, but, when the mixing temperature is set within the above-described preferred range, the fluidity does not decrease too much, and produced crystals are unlikely to be remelted. The melting point herein refers to the crystal melting temperature measured with a differential scanning calorimeter by increasing the temperature from 30° C. to 250° C. at a heating rate of 20° C./min.

Poly-L-lactic acid and poly-D-lactic acid crystallized in a melting apparatus under shearing or pressure are preferably mixed at a shear rate 10 to 400 (/second). When the shear rate is within the preferred range, poly-L-lactic acid and poly-D-lactic acid can be uniformly mixed while the fluidity and crystallinity are maintained, and thermal degradation due to shear heating is unlikely to occur during the mixing.

The pressure applied during the mixing is preferably 0.05 to 10 (MPa). When the pressure is within the preferred range, poly-L-lactic acid and poly-D-lactic acid can be uniformly mixed while the fluidity and crystallinity are maintained.

In kneading using an extruder, the method of supplying polylactic acid is not limited, and examples of possible methods thereof include a method in which poly-L-lactic acid and poly-D-lactic acid are supplied at once from a resin hopper, and a method in which, using a side resin hopper as required, poly-L-lactic acid and poly-D-lactic acid are separately supplied via a resin hopper and a side resin hopper. The polylactic acid may also be supplied in the molten state to the extruder directly after the step of producing the polylactic acid.

The screw element of the extruder is preferably equipped with a kneading element in the mixing section such that the poly-L-lactic acid and poly-D-lactic acid can be uniformly mixed to form stereocomplexes.

In the mixing step, the mixing weight ratio between the poly-L-lactic acid composed of L-lactic acid units and the poly-D-lactic acid composed of D-lactic acid units is preferably 90:10 to 10:90. The mixing weight ratio is more preferably 80:20 to 20:80, and especially preferably 75:25 to 60:40 or 40:60 to 25:75. When the mixing weight ratio between the total segment(s) composed of L-lactic acid units and the total segment(s) composed of D-lactic acid units is within the above-described preferred range, a polylactic acid stereocomplex is likely to be formed, resulting in a sufficient increase in the melting point of the polylactic acid block copolymer. When the mixing weight ratio between the poly-L-lactic acid and poly-D-lactic acid is other than 50:50, it is preferred to blend the poly-L-lactic acid or poly-D-lactic having a higher weight average molecular weight than the other in a larger amount.

In this mixing step, it is preferred to include a catalyst in the mixture for efficiently promoting the subsequent solid-state polymerization. The catalyst may be the residual component(s) of the catalyst(s) used for producing the poly-L- lactic acid and/or poly-D-lactic acid, and/or one or more selected from the above-described catalysts may be further added in the mixing step.

The content of the catalyst for efficient promotion of solid-state polymerization is not limited, and preferably not less than 0.001 parts by weight and not more than 1 part by weight, and especially preferably not less than 0.001 parts by weight and not more than 0.5 parts by weight with respect to 100 parts by weight of the mixture of the poly-L-lactic acid and poly-D-lactic acid. When the amount of catalyst is within the above-described preferred range, the effect of reducing the reaction time of solid-state polymerization can be obtained, and the molecular weight of the polylactic acid block copolymer finally obtained tends to be high.

The weight average molecular weight (Mw) of the mixture of poly-L-lactic acid and poly-D-lactic acid after the mixing is preferably not less than 90,000 and less than 300,000 in view of the mechanical properties of the mixture. The weight average molecular weight is more preferably not less than 120,000 and less than 300,000, and especially preferably not less than 140,000 and less than 300,000.

The polydispersity of the mixture of poly-L-lactic acid and poly-D-lactic acid after mixing is preferably 1.5 to 4.0. The polydispersity is more preferably 2.0 to 3.7, and especially preferably 2.5 to 3.5. The polydispersity herein refers to the ratio of the weight average molecular weight with respect to the number average molecular weight of the mixture, and is more particularly a value measured by gel permeation chromatography (GPC) using hexafluoroisopropanol or chloroform as a solvent and calculated in terms of poly(methyl methacrylate) standards.

Each of the amount of lactide and the amount of oligomers contained in each of poly-L-lactic acid and poly-D-lactic acid is preferably not more than 5%. The amount is more preferably not more than 3%, especially preferably not more than 1%. The amount of lactic acid contained in the poly-L-lactic acid or poly-D-lactic acid is preferably not more than 2%. The amount is more preferably not more than 1%, especially preferably not more than 0.5%.

When the mixture is subjected to solid-state polymerization, the form of the mixture of poly-L-lactic acid and poly-D-lactic acid is not limited, and the mixture may be in the form of a block(s), film(s), pellet(s), powder or the like. In view of efficient promotion of the solid-state polymerization, a pellet(s) or powder is/are preferably used. Examples of the method of forming the mixture of poly-L-lactic acid and poly-D-lactic acid into a pellet(s) include a method in which the mixture is extruded into a strand-like shape and pelletized, and a method in which the mixture is extruded into water and pelletized using an underwater cutter. Examples of the method of forming the mixture of poly-L-lactic acid and poly-D-lactic acid into powder include a method in which the mixture is pulverized using a pulverizer such as a mixer, blender, ball mill or hammer mill. The method of carrying out the solid-state polymerization step is not limited, and either a batch method or continuous method may be employed. The reactor may be a stirring-vessel-type reactor, mixer-type reactor, column reactor or the like, and two or more types of these reactors may be used in combination.

When this solid-state polymerization step is carried out, the mixture of poly-L-lactic acid and poly-D-lactic acid is preferably crystallized. When the mixture obtained by the step of mixing poly-L-lactic acid and poly-D-lactic acid is in the crystallized state, crystallization of the mixture of poly-L-lactic acid and poly-D-lactic acid is not necessarily required to carry out the solid-state polymerization, but performing crystallization allows further enhancement of the efficiency of solid-state polymerization.

The method of crystallization is not limited, and a known method may be employed. Examples of the method include a method by maintaining the polylactic acid at a crystallization treatment temperature in the gas phase or liquid phase and a method by cooling and solidifying a molten mixture of poly-L-lactic acid and poly-D-lactic acid while carrying out the operation of stretching or shearing. In view of simplicity of the operation, the method by maintaining the polylactic acid at a crystallization treatment temperature in the gas phase or liquid phase is preferred.

The crystallization treatment temperature herein is not limited as long as the temperature is higher than the glass-transition temperature and lower than the melting point of the polylactic acid having a lower melting point selected from the poly-L-lactic acid and the poly-D-lactic acid mixed. The crystallization treatment temperature is more preferably between the heating crystallization temperature and the cooling crystallization temperature preliminarily measured with a differential scanning calorimeter.

The crystallization may be carried out under any of the conditions of reduced, normal and increased pressures.

The crystallization period is not limited, and the crystallization can be sufficiently achieved within 3 hours, and a length of time of not more than 2 hours is also preferred.

In terms of the temperature conditions of carrying out the solid-state polymerization step, a temperature of less than the melting point of the mixture of poly-L-lactic acid and poly-D-lactic acid is preferred. Since the mixture of poly-L-lactic acid and poly-D-lactic acid has a melting point of 190° C. to 230° C. derived from stereocomplex crystals due to stereocomplex formation and a melting point of 150° C. to 185° C. derived from crystals of poly-L-lactic acid alone and crystals of poly-D-lactic acid alone, solid-state polymerization is preferably carried out at a temperature of less than these melting points. More specifically, the temperature is preferably not less than 100° C. and not more than 220° C., and, in view of efficiently promoting the solid-state polymerization, the temperature is more preferably not less than 110° C. and not more than 200° C., still more preferably not less than 120° C. and not more than 180° C., and especially preferably not less than 130° C. and not more than 170° C.

For reducing the reaction time of the solid-state polymerization, the temperature is preferably increased stepwise or continuously as the reaction proceeds. The temperature conditions to increase the temperature stepwise during the solid-state polymerization are preferably 120° C. to 145° C. for 1 hour to 15 hours in the first step, 135° C. to 160° C. for 1 hour to 15 hours in the second step, and 150° C. to 175° C. for 10 hours to 30 hours in the third step; more preferably 130° C. to 145° C. for 2 hours to 12 hours in the first step, 140° C. to 160° C. for 2 hours to 12 hours in the second step, and 155° C. to 175° C. for 10 hours to 25 hours in the third step. In terms of the temperature conditions for increasing the temperature continuously during the solid-state polymerization, the temperature is preferably increased from an initial temperature of 130° C. to 150° C. to a temperature of 150° C. to 175° C. continuously at a rate of 1° C. to 5° C. (/min). Further, combination of stepwise temperature increase and continuous temperature increase is also preferred in view of efficient promotion of the solid-state polymerization.

When the solid-state polymerization step is carried out, the step is preferably performed under vacuum or under the flow of an inert gas such as dry nitrogen. The degree of vacuum during the solid-state polymerization under vacuum is preferably not more than 150 Pa, more preferably not more than 75 Pa, especially preferably not more than 20 Pa. The flow rate during the solid-state polymerization under the flow of an inert gas is preferably 0.1 to 2,000 (mL/min.), more preferably 0.5 to 1,000 (mL/min.), especially preferably 1.0 to 500 (mL/min.), per 1 g of the mixture.

The yield of the polymer (Y) after the solid-state polymerization is preferably not less than 90%. The yield is more preferably not less than 93%, and especially preferably not less than 95%. The yield of the polymer (Y) herein refers to the ratio of the weight of the polylactic acid block copolymer after the solid-state polymerization with respect to the weight of the mixture before the solid-state polymerization. More specifically, the yield of the polymer (Y) can be calculated according to Equation (7) below, where Wp represents the weight of the mixture before the solid-state polymerization and Ws represents the weight of the polymer after the solid-state polymerization:

$$Y=Ws/Wp \times 100 \qquad (7).$$

In the solid-state polymerization step, the polydispersity of the mixture preferably decreases. More specifically, the polydispersity preferably changes from a value 1.5 to 4.0, which is for the mixture before the solid-state polymerization, to a value 1.5 to 2.7, which is for the polylactic acid block copolymer after the solid-state polymerization. The polydispersity more preferably decreases from a value 2.0 to 3.7, which is for the mixture before the solid-state polymerization, to a value 1.8 to 2.6, which is for the polylactic acid block copolymer after the solid-state polymerization. The polydispersity especially preferably changes from a value 2.5 to 3.5, which is for the mixture before the solid-state polymerization, to a value 2.0 to 2.5, which is for the polylactic acid block copolymer after the solid-state polymerization.

Production Method 3

The method in which poly-L-lactic acid and poly-D-lactic acid are melt mixed at a temperature of not less than the end of melting point of the component having a higher melting point for a long time to perform transesterification between the segment(s) of L-lactic acid units and the segment(s) of D-lactic acid units, to obtain a polylactic acid block copolymer will now be described. Also in this production method, either the ring-opening polymerization method or the direct polymerization method described above may be used for the method of producing poly-L-lactic acid and poly-D-lactic acid.

To obtain a polylactic acid block copolymer by this method, one of the poly-L-lactic acid and poly-D-lactic acid preferably has a weight average molecular weight not less than 60,000 and not more than 300,000, and the other preferably has a weight average molecular weight not less than 10,000 and not more than 50,000 in view of achieving a high degree of stereocomplexation after melt mixing. More preferably, one of the polylactic acids has a weight average molecular weight not less than 100,000 and not more than 270,000, and the other has a weight average molecular weight not less than 15,000 and not more than 45,000. Especially preferably, one of the polylactic acids has a weight average molecular weight not less than 150,000 and not more than 240,000, and the other has a weight average molecular weight not less than 20,000 and not more than 40,000. The combination of the weight average molecular weights of the poly-L-lactic acid and poly-D-lactic acid is preferably appropriately selected such that the weight average molecular weight after mixing is not less than 90,000.

In view of achieving higher mechanical properties of a polylactic acid resin composition after melt mixing, one of the poly-L-lactic acid and poly-D-lactic acid preferably has a weight average molecular weight not less than 60,000 and not more than 300,000, and the other preferably has a weight average molecular weight not less than 10,000 and not more than 100,000.

Examples of the method of melt mixing at a temperature of not less than the end of melting point for a long time include a method in which poly-L-lactic acid and poly-D-lactic acid are mixed by a batch method or continuous method, either of which may be employed for the mixing. Examples of the kneading machine include single screw extruders, twin screw extruders, plastomill, kneaders and stirring-vessel-type reactors equipped with a pressure reducing device. In view of enabling uniform and sufficient kneading, a single screw extruder or twin screw extruder is preferably used.

In terms of the temperature conditions for the mixing, the mixing needs to be carried out at a temperature of not less than the end of melting point of the component having a higher melting point selected from the poly-L-lactic acid and poly-D-lactic acid. The temperature is preferably 140° C. to 250° C., more preferably 160° C. to 230° C., and especially preferably 180° C. to 210° C. When the mixing temperature is within the above-described preferred range, the fluidity does not decrease too much and the molecular weight of the mixture is unlikely to decrease.

In terms of the time conditions for the mixing, the length of time is of preferably 0.1 minutes to 30 minutes, more preferably 0.3 minutes to 20 minutes, and especially preferably 0.5 minutes to 10 minutes. When the mixing time is within the above-described preferred range, the poly-L-lactic acid and poly-D-lactic acid can be uniformly mixed, and thermal degradation is less likely to occur by the mixing.

The pressure conditions during the mixing are not limited, and the mixing may be carried out either in the air or under an atmosphere of an inert gas such as nitrogen.

The mixing weight ratio between the poly-L-lactic acid composed of L-lactic acid units and the poly-D-lactic acid composed of D-lactic acid units to be mixed is preferably 80:20 to 20:80, more preferably 75:25 to 25:75, still more preferably 70:30 to 30:70, and especially preferably 60:40 to 40:60. When the weight ratio of the poly-L-lactic acid composed of L-lactic acid units is within the above-described preferred range, a polylactic acid stereocomplex is likely to be formed, resulting in a sufficient increase in the melting point of the polylactic acid block copolymer finally obtained.

To efficiently promote transesterification between the segment(s) of L-lactic acid units and the segment(s) of D-lactic acid units in this mixing step, a catalyst is preferably included in the mixture. The catalyst may be the residual component(s) of the catalyst(s) used to produce the poly-L-lactic acid and/or poly-D-lactic acid, and/or a catalyst(s) may be further added in the mixing step.

The content of the catalyst is not limited, and preferably not less than 0.001 parts by weight and not more than 1 part by weight, and especially preferably not less than 0.001 parts by weight and not more than 0.5 parts by weight with respect to 100 parts by weight of the mixture of the poly-L-lactic acid and poly-D-lactic acid. When the amount of catalyst is within the above-described preferred range, the frequency of transesterification of the mixture is sufficiently high, and the molecular weight of the polylactic acid block copolymer finally obtained tends to be high.

Production Method 4

The method in which a polyfunctional compound(s) is/are mixed with poly-L-lactic acid and poly-D-lactic acid to cause covalent bonding of poly-L-lactic acid and poly-D-lactic acid by the polyfunctional compound(s) to obtain a polylactic acid block copolymer will now be described. The poly-L-lactic acid and poly-D-lactic acid to be used in this production method may be produced by either the ring-opening polymerization method or the direct polymerization method described above.

Preferably, in terms of the weight average molecular weight of the poly-L-lactic acid and poly-D-lactic acid used for obtaining a polylactic acid block copolymer in this method, one of the poly-L-lactic acid and poly-D-lactic acid has a weight average molecular weight of not less than 30,000 and not more than 100,000 and the other has a weight average molecular weight of not less than 10,000 and not more than 30,000 in view of increasing the degree of stereocomplexation. More preferably, one of the polylactic acids has a weight average molecular weight of not less than 35,000 and not more than 90,000 and the other has a weight average molecular weight of not less than 10,000 and not more than 25,000. Especially preferably, one of the polylactic acids has a weight average molecular weight of not less than 40,000 and not more than 80,000 and the other has a weight average molecular weight of not less than 10,000 and not more than 20,000.

In view of achieving higher mechanical properties of a polylactic acid resin composition after melt mixing, one of the poly-L-lactic acid and poly-D-lactic acid preferably has a weight average molecular weight not less than 60,000 and not more than 300,000, and the other preferably has a weight average molecular weight not less than 10,000 and not more than 100,000.

The ratio between the weight average molecular weight of the poly-L-lactic acid and the weight average molecular weight of the poly-D-lactic acid used in the above-described mixing is preferably not less than 2 and less than 10 in view of increasing the degree of stereocomplexation. The ratio is more preferably not less than 3 and less than 10, and especially preferably not less than 4 and less than 10.

The poly-L-lactic acid and poly-D-lactic acid preferably satisfy that the weight average molecular weight of each of the poly-L-lactic acid component and the poly-D-lactic acid component is within the above-described range, and that a ratio between the weight average molecular weight of the poly-L-lactic acid component and the weight average molecular weight of the poly-D-lactic acid component is not less than 2 and less than 30.

The polyfunctional compound(s) used herein is not limited, and examples thereof include polycarboxylic acid anhydrides, polycarboxylic acid halides, polycarboxylic acid, polycarbodiimides, polyisocyanates, polyamines, polyalcohols, and polyepoxy compounds. Specific examples include polycarboxylic acid anhydrides such as 1,2-cyclohexane dicarboxylic anhydride, succinic acid anhydride, phthalic acid anhydride, trimellitic acid anhydride, 1,8-naphthalene dicarboxylic acid anhydride, and pyromellitic acid anhydride; polycarboxylic acid halides such as isophthalic acid chloride, terephthalic acid chloride, and 2,6-naphthalene dicarboxylic acid chloride; polycarboxylic acid such as succinic acid, adipic acid, sebacic acid, fumaric acid, terephthalic acid, isophthalic acid, and 2,6-naphthalene dicarboxylic acid; polycarbodiimides such as poly(1,6-cyclohexane carbodiimide), poly(4,4'-methylenebis cyclohexyl carbodiimide), poly(1,3-cyclohexylene carbodiimide), poly(1,4-cyclohexylene carbodiimide), poly(4,4'-diphenylmethane carbodiimide), poly(3,3'-dimethyl-4,4'-diphenylmethane carbodiimide), poly(naphthylene carbodiimide), poly(p-phenylene carbodiimide), poly(m-phenylene carbodiimide), poly(p-tolyl carbodiimide), poly (diisopropyl carbodiimide), poly(methyl diisopropyl phenylene carbodiimide), poly(triethylphenylene carbodiimide), and cyclic carbodiimides bonded with aliphatic groups, alicyclic groups, or aromatic groups; polyisocyanates such as hexamethylene diisocyanate, 4,4'-diphenylmethane diisocyanate, and toluene-2,4-diisocyanate; polyamines such as ethylene diamine, hexane diamine, and diethylene triamine; polyalcohols such as ethylene glycol, propylene glycol, butanediol, hexanediol, glycerin, trimethylol propane, and pentaerythritol; and polyepoxy compounds such as diglycidyl terephthalate, naphthalene dicarboxylic acid diglycidyl ester, trimellitic acid triglycidyl ester, pyromellitic acid tetraglycidyl ester, ethylene glycol diglycidyl ether, propylene glycol diglycidyl ether, cyclohexane dimethanol diglycidyl ether, glycerol triglycidyl ether, trimethylol propane triglycidyl ether, and pentaerythritol polyglycidyl ether. Among them, polycarboxylic acid anhydrides, polyisocyanates, polyalcohols, and polyepoxy compounds are preferable, and polycarboxylic acid anhydrides, polyisocyanates, and polyepoxy compounds are more preferable. One of these or a combination of two or more of these may be used.

The amount of the polyfunctional compound(s) to be mixed is not limited, and is preferably not less than 0.01 parts by weight and not more than 20 parts by weight, more preferably not less than 0.1 parts by weight and not more than 10 parts by weight with respect to 100 parts by weight of the total of poly-L-lactic acid and poly-D-lactic acid. When the amount of the polyfunctional compound(s) added is within the above-described preferred range, the effect of forming covalent bonds can be sufficiently produced.

Further, when a polyfunctional compound(s) is/are used, a reaction catalyst(s) may be added for promoting the reaction of poly-L-lactic acid and poly-D-lactic acid with the polyfunctional compound(s). Examples of the reaction catalyst(s) include alkali metal compounds such as sodium hydroxide, potassium hydroxide, lithium hydroxide, cesium hydroxide, sodium hydrogen carbonate, potassium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogenphosphate, dipotassium hydrogenphosphate, dilithium hydrogenphosphate, disodium salt of bisphenol A, dipotassium salt of bisphenol A, dilithium salt of bisphenol A, sodium salt of phenol, potassium salt of phenol, lithium salt of phenol and cesium salt of phenol; alkaline earth metal compounds such as calcium hydroxide, barium hydroxide, magnesium hydroxide, strontium hydroxide, calcium hydrogen carbonate, barium carbonate, magnesium carbonate, strontium carbonate, calcium acetate, barium acetate, magnesium acetate, strontium acetate, calcium stearate, magnesium stearate and strontium stearate; tertiary amines such as triethylamine, tributylamine, trihexylamine, triamylamine, triethanolamine, dimethyl aminoethanol, triethylenediamine, dimethylphenylamine, dimethylbenzylamine, 2-(dimethylaminomethyl)phenol, dimethylaniline, pyridine, picoline and 1,8-diazabicyclo(5, 4,0)undecene-7; imidazole compounds such as 2-methylimidazole, 2-ethylimidazole, 2-isopropylimidazole, 2-ethyl-4-methylimidazole and 4-phenyl-2-methylimidazole; quaternary ammonium salts such as tetramethylammonium chloride, tetraethylammonium chloride, tetrabutylammonium bromide, trimethylbenzylammonium chloride, triethylbenzylammonium chloride, tripropylbenzylammonium chloride and N-methylpyridinium chloride; phosphine compounds such as trimethylphosphine, triethylphosphine, tributylphosphine and trioctylphosphine; phosphonium salts such as tetramethylphosphonium bromide, tetrabutylphosphonium bromide, tetraphenylphosphonium bromide, ethyltriphenylphosphonium bromide and triphenylbenzylphosphonium bromide; phosphoric acid esters such as trimethyl phosphate, triethyl phosphate, tributyl phosphate, trioctyl phosphate, tributoxyethyl phosphate, triphenyl phosphate, tricresyl phosphate, trixylenyl phosphate, cresyl diphenyl phosphate, octyl diphenyl phosphate, tri(p-hydroxy)phenyl phosphate and tri(p-methoxy)phenyl phosphate; organic acids such as oxalic acid, p-toluenesulfonic acid, dinonylnaphthalene disulfonic acid and dodecylbenzenesulfonic acid; and Lewis acids such as boron trifluoride, aluminum tetrachloride, titanium tetrachloride and tin tetrachloride. One of these or a combination of two or more of these may be used.

The amount of the catalyst(s) to be added is not limited, and is preferably not less than 0.001 parts by weight and not more than 1 part by weight with respect to 100 parts by weight of the total of poly-L-lactic acid and poly-D-lactic acid. When the amount of the catalyst(s) is within the above-described preferred range, the effect of promoting the reaction can be obtained, and the molecular weight of the polylactic acid block copolymer finally obtained tends to be high.

The method of causing the poly-L-lactic acid and poly-D-lactic acid to react with the polyfunctional compound(s) is not limited, and examples of the method include a method in which melt mixing is performed at a temperature of not less than the end of melting point of the component having a higher melting point selected from the poly-L-lactic acid and poly-D-lactic acid.

Examples of the method in which melt mixing is performed at a temperature of not less than the end of melting point include a method in which poly-L-lactic acid and poly-D-lactic acid are mixed by a batch method or continuous method, either of which may be employed. Examples of the kneading machine include single screw extruders, twin screw extruders, plastomill, kneaders and stirring-vessel-type reactors equipped with a pressure reducing device. In view of enabling uniform and sufficient kneading, a single screw extruder or twin screw extruder is preferably used.

In terms of the temperature conditions for melt mixing, the melt mixing is preferably carried out at a temperature of not less than the end of melting point of the component having a higher melting point selected from the poly-L-lactic acid and poly-D-lactic acid. The temperature is preferably 140° C. to 250° C., more preferably 160° C. to 230° C., and especially preferably 180° C. to 210° C. When the mixing temperature is within the above-described preferred range, the fluidity does not decrease too much, and the molecular weight of the mixture is unlikely to decrease.

In terms of the time conditions for the melt mixing, the length of time is preferably 0.1 minutes to 30 minutes, more preferably 0.3 minutes to 20 minutes, and especially preferably 0.5 minutes to 10 minutes. When the mixing time is within the above-described preferred range, the poly-L-lactic acid and poly-D-lactic acid can be uniformly mixed, and thermal degradation is less likely to occur during the mixing.

The pressure conditions during the melt mixing are not limited, and the mixing may be carried out either in the air or under an atmosphere of an inert gas such as nitrogen.

The mixing weight ratio between the poly-L-lactic acid composed of L-lactic acid units and the poly-D-lactic acid composed of D-lactic acid units to be mixed is preferably 90:10 to 10:90, and more preferably 80:20 to 20:80. The mixing weight ratio is especially preferably 75:25 to 60:40 or 40:60 to 25:75. When the weight ratio of the poly-L-lactic acid composed of L-lactic acid units is within the above-described preferred range, a polylactic acid stereocomplex is likely to be formed, resulting in a sufficient increase in the melting point of the polylactic acid block copolymer finally obtained.

Although the polylactic acid block copolymer obtained by mixing a polyfunctional compound(s) with poly-L-lactic acid and poly-D-lactic acid is a high molecular weight product because of covalent bonding of poly-L-lactic acid and poly-D-lactic acid caused by the polyfunctional compound(s), solid-state polymerization may also be carried out by the above-mentioned method after the mixing.

Production Method of Polylactic Acid Stereocomplex by Mixing Poly-L-Lactic Acid and Poly-D-Lactic Acid Preferably, in terms of the weight average molecular weight of the poly-L-lactic acid and poly-D-lactic acid used for obtaining a polylactic acid stereocomplex in this method, one of the poly-L-lactic acid and poly-D-lactic acid has a weight average molecular weight of not less than 30,000 and not more than 100,000 and the other has a weight average molecular weight of not less than 10,000 and not more than 30,000 in view of increasing the degree of stereocomplexation. More preferably, one of the polylactic acids has a weight average molecular weight of not less than 35,000 and not more than 90,000 and the other has a weight average molecular weight of not less than 10,000 and not more than 25,000. Especially preferably, one of the polylactic acids has a weight average molecular weight of not less than 40,000 and not more than 80,000 and the other has a weight average molecular weight of not less than 10,000 and not more than 20,000.

In another preferred aspect regarding the weight average molecular weight of the poly-L-lactic acid and poly-D-lactic acid, one of the poly-L-lactic acid and poly-D-lactic acid has a weight average molecular weight of not less than 60,000 and not more than 300,000, and the other has a weight average molecular weight of not less than 10,000 and not more than 100,000. Preferably, one of the polylactic acids has a weight average molecular weight of not less than 100,000 and not more than 270,000, and the other has a weight average molecular weight of not less than 20,000 and not more than 80,000. More preferably, one of the polylactic acids has a weight average molecular weight of not less than 125,000 and not more than 255,000, and the other has a weight average molecular weight of not less than 25,000 and not more than 65,000. Especially preferably, one of the polylactic acids has a weight average molecular weight of not less than 150,000 and not more than 240,000, and the other has a weight average molecular weight of not less than 30,000 and not more than 45,000.

The ratio between the weight average molecular weight of the poly-L-lactic acid and the weight average molecular weight of the poly-D-lactic acid used in the above-described mixing is preferably not less than 2 and less than 10 in view of increasing the degree of stereocomplexation. The ratio is more preferably not less than 3 and less than 10, and especially preferably not less than 4 and less than 10.

The poly-L-lactic acid and poly-D-lactic acid preferably satisfy that the weight average molecular weight of each of the poly-L-lactic acid component and the poly-D-lactic acid component is within the above-described range, and that a ratio between the weight average molecular weight of the poly-L-lactic acid component and the weight average molecular weight of the poly-D-lactic acid component is not less than 2 and less than 30.

The method of mixing poly-L-lactic acid and poly-D-lactic acid is not limited, and examples of the method include a method in which poly-L-lactic acid and poly-D-lactic acid are melt mixed at a temperature of not less than the end of melting point of the component having a higher melting point, a method in which mixing in a solvent is followed by removal of the solvent, and a method in which at least one of poly-L-lactic acid and poly-D-lactic acid in the molten state is retained in a melting apparatus at a temperature between the melting point −50° C. and the melting point +20° C. under shearing, followed by mixing such that crystals of the mixture composed of poly-L-lactic acid and poly-D-lactic acid remain.

The melting point herein means the temperature at the peak top of the peak due to melting of crystals of polylactic acid alone as measured with a differential scanning calorimeter, and the end of melting point means the temperature at the end of the peak due to melting of crystals of polylactic acid alone as measured with a differential scanning calorimeter.

Examples of the method in which melt mixing is performed at a temperature of not less than the end of melting point include a method in which poly-L-lactic acid and poly-D-lactic acid are mixed by a batch method or continuous method, either of which may be employed for the mixing. Examples of the kneading machine include single screw extruders, twin screw extruders, plastomill, kneaders and stirring-vessel-type reactors equipped with a pressure reducing device. In view of enabling uniform and sufficient kneading, a single screw extruder or twin screw extruder is preferably used.

In terms of the temperature conditions for melt mixing at a temperature of not less than the end of melting point, poly-L-lactic acid and poly-D-lactic acid are preferably melt mixed at a temperature of not less than the end of melting point of the component having a higher melting point. The temperature is preferably 140° C. to 250° C., more preferably 160° C. to 230° C., and especially preferably 180° C. to 210° C. When the mixing temperature is within the preferred range, the mixing can be carried out in the molten state, and the molecular weight is unlikely to decrease during the mixing. Further, the fluidity of the mixture can be kept constant and a significant decrease in the fluidity is unlikely to occur.

In terms of the time conditions for mixing, the mixing time is preferably 0.1 minutes to 10 minutes, more preferably 0.3 minutes to 5 minutes, and especially preferably 0.5 minutes to 3 minutes. When the mixing time is within the preferred range, poly-L-lactic acid and poly-D-lactic acid can be uniformly mixed, and thermal degradation due to mixing is unlikely to occur.

The pressure conditions for the mixing at a temperature of not less than the end of melting point is not limited, and the mixing may be carried out either in the air or under an atmosphere of an inert gas such as nitrogen.

Specific examples of the method of mixing poly-L-lactic acid and poly-D-lactic acid crystallized in a melting apparatus under shearing or pressure include mixing by a batch method or continuous method, and either method may be used for the mixing. The degree of stereocomplexation of the mixture of poly-L-lactic acid and poly-D-lactic acid after mixing can be controlled by a method in which poly-L-lactic acid and poly-D-lactic acid in the molten state are retained in a melting apparatus under shearing at a temperature between the melting point −50° C. and the melting point +20° C. of the polylactic acid having a lower melting point, or by a method in which poly-L-lactic acid and poly-D-lactic acid in the molten state are retained in a melting apparatus under pressure at a temperature between the melting point −50° C. and the melting point +20° C. of the polylactic acid having a lower melting point.

The degree of stereocomplexation (Sc) herein is preferably not less than 80%, more preferably not less than 85%, and especially preferably not less than 90%. Specifically, according to Equation (5) of above, the degree of stereocomplexation (Sc) satisfies Equation (2) below:

$$Sc=\Delta Hh/(\Delta Hl+\Delta Hh)\times 100\geq 80 \qquad (2).$$

The temperature during mixing is preferably between the melting point −50° C. and the melting point +20° C. according to the melting point of the mixture of poly-L-lactic acid and poly-D-lactic acid. The mixing temperature is more preferably between the melting point −40° C. and the melting point, especially preferably between the melting point −30° C. and the melting point −5° C. The temperature of the melting apparatus is conventionally preferably set to a temperature of not less than the melting point +20° C. for melting the resin to allow achievement of good fluidity, but, when the mixing temperature is set within the above-described preferred range, the fluidity does not decrease too much, and produced crystals are unlikely to be remelted. The melting point herein refers to the crystal melting temperature measured by using a differential scanning calorimeter by increasing the temperature from 30° C. to 250° C. at a heating rate of 20° C./min.

Poly-L-lactic acid and poly-D-lactic acid crystallized in a melting apparatus under shearing or pressure are preferably mixed at a shear rate 10 to 400 (/second). When the shear rate is within the preferred range, poly-L-lactic acid and poly-D-lactic acid can be uniformly mixed while the fluidity and crystallinity are maintained, and thermal degradation due to shear heating is unlikely to occur during the mixing.

The pressure during the mixing is preferably 0.05 to 10 (MPa). When the pressure is within the preferred range, poly-L-lactic acid and poly-D-lactic acid can be uniformly mixed while the fluidity and crystallinity are maintained.

In kneading using an extruder, the method of supplying polylactic acid is not limited, and examples of possible methods thereof include a method in which poly-L-lactic acid and poly-D-lactic acid are supplied at once from a resin hopper, and a method in which, using a side resin hopper as required, poly-L-lactic acid and poly-D-lactic acid are separately supplied via a resin hopper and a side resin hopper. The polylactic acid may also be supplied in the molten state to the extruder directly after the step of producing the polylactic acid.

The screw element of the extruder is preferably equipped with a kneading element in the mixing section such that the poly-L-lactic acid and poly-D-lactic acid can be uniformly mixed to form stereocomplexes.

In the mixing step, the mixing weight ratio between the poly-L-lactic acid composed of L-lactic acid units and the poly-D-lactic acid composed of D-lactic acid units is preferably 90:10 to 10:90. The mixing weight ratio is more preferably 80:20 to 20:80, and especially preferably 75:25 to 60:40 or 40:60 to 25:75. When the mixing weight ratio between the total segment(s) composed of L-lactic acid units and the total segment(s) composed of D-lactic acid units is within the above-described preferred range, a polylactic acid stereocomplex is likely to be formed, resulting in the higher heat resistance of the stereocomplex. When the mixing weight ratio between the poly-L-lactic acid and poly-D-lactic acid is other than 50:50, it is preferred to blend the poly-L-lactic acid or poly-D-lactic having a higher weight average molecular weight than the other in a larger amount.

The polydispersity of the mixture of poly-L-lactic acid and poly-D-lactic acid after mixing is preferably 1.5 to 4.0. The polydispersity is more preferably 2.0 to 3.7, and especially preferably 2.5 to 3.5. The polydispersity herein refers to the ratio of the weight average molecular weight with respect to the number average molecular weight of the mixture, and is more particularly a value measured by gel permeation chromatography (GPC) using hexafluoroisopropanol or chloroform as a solvent and calculated in terms of poly(methyl methacrylate) standards.

A polylactic acid block copolymer composed of poly-L-lactic acid segments containing L-lactic acid as a main component and poly-D-lactic acid segments containing D-lactic acid as a main component can be mixed in the stereocomplex including a mixture of poly-L-lactic acid and poly-D-lactic acid to enhance the formability of the stereocomplex.

The method of producing a polylactic acid block copolymer to be added is not limited, and conventional methods for producing polylactic acid may be used. Specific examples of the method include Production Methods 1 to 4 for producing polylactic acid block copolymers described above, and are the lactide method in which either cyclic dimer L-lactide or D-lactide produced from raw material lactic acid is subjected to ring-opening polymerization in the presence of a catalyst and the lactide with the optical isomer to the polylactic acid above described is further added, followed by subjecting the resulting mixture to ring-opening polymerization, to obtain a polylactic acid block copolymer Production Method 1; a method in which poly-L-lactic acid and poly-D-lactic acid are each polymerized by direct polymerization of the raw material or by ring-opening polymerization via lactide, and the obtained poly-L-lactic acid and poly-D-lactic acid are then mixed, followed by obtaining a polylactic acid block copolymer by solid-state polymerization Production Method 2; a method in which poly-L-lactic acid and poly-D-lactic acid are melt mixed at a temperature of not less than the end of melting point of the component having a higher melting point for a long time to perform transesterification between the segment(s) of L-lactic acid units and the segment(s) of D-lactic acid units, to obtain a polylactic acid block copolymer Production Method 3; and a method in which a polyfunctional compound(s) is/are mixed with poly-L-lactic acid and poly-D-lactic acid and the reaction is allowed to proceed to cause covalent bonding of poly-L-lactic acid and poly-D-lactic acid by the polyfunctional compound(s), to obtain a polylactic acid block copolymer Production Method 4.

A method of mixing a polylactic acid block copolymer into a stereocomplex including poly-L-lactic acid and poly-D-lactic acid is not particularly limited, and examples thereof include a method in which a stereocomplex including poly-L-lactic acid and poly-D-lactic acid, and a polylactic acid block copolymer, are melt mixed at a temperature of not less than the end of melting point of the component having a higher melting point; and a method in which mixing in a solvent is followed by removal of the solvent.

The order of mixing of poly-L-lactic acid, poly-D-lactic acid, and a polylactic acid block copolymer is not particularly limited. A polylactic acid block copolymer can be mixed in premixed poly-L-lactic acid and poly-D-lactic acid, or poly-L-lactic acid and poly-D-lactic acid can be mixed in a polylactic acid block copolymer.

The amount of the polylactic acid block copolymer to be mixed with a stereocomplex including poly-L-lactic acid and poly-D-lactic acid is preferably not less than 1 part by weight and not more than 100 parts by weight, and more preferably not less than 5 parts by weight and not more than 80 parts by weight with respect to 100 parts by weight of the stereocomplex including a mixture of poly-L-lactic acid and poly-D-lactic acid. When the amount of the polylactic acid block copolymer is within the above-described preferred range, the formability of the stereocomplex can be enhanced.

Polylactic Acid Resin Composition

The polylactic acid resin composition is characterized by including 0.005 parts by weight to 1 part by weight of a metal phosphate with respect to 100 parts by weight of a polylactic acid resin including a poly-L-lactic acid component and a poly-D-lactic acid component.

In view of improving the crystallization properties and transparency, a crystallized calorie (enthalpy of crystallization) of a polylactic acid resin is preferably not less than 5 J/g when the temperature of the polylactic acid resin composition is increased to 250° C. at a heating rate of 20° C./min, and the temperature is kept constant for 3 minutes, followed by decreasing the temperature at a cooling rate of 20° C./min in differential scanning calorimetry (DSC), and is more preferably not less than 20 J/g.

In view of suppressing the thermal degradation of a polylactic acid resin to improve residence stability, the weight loss percentage of a polylactic acid resin is preferably less than 1.0%, after the polylactic acid resin composition is heated at 240° C. for 30 minutes in a thermogravimetric analysis (Thermo Gravimetry Analysis: TGA).

The metal phosphate is represented by Formula (1):

$$M_xH_yPO_z \quad (1)$$

(in Formula (1), M is an alkali metal atom or an alkaline earth metal atom, and each of x, y, and z is an integer satisfying $1 \leq x \leq 2$, $1 \leq y \leq 4$, and $2 \leq z \leq 8$, respectively).

The metal phosphate is at least one selected from the group consisting of sodium dihydrogen phosphate, potassium dihydrogen phosphate, lithium dihydrogen phosphate, calcium dihydrogen phosphate, disodium hydrogen phosphate, dipotassium hydrogen phosphate, calcium hydrogen phosphate, barium hydrogen phosphate, magnesium hydrogen phosphate, sodium hydrogen phosphite, potassium phosphite, calcium hydrogen phosphite, sodium hypophosphite, potassium hypophosphite, and calcium hypophosphite. Among them, sodium dihydrogen phosphate and potassium dihydrogen phosphate are more preferable. The particle size of a metal phosphate is preferably 0.1 to 500 (μm) in view of uniform dispersibility to a polylactic acid resin. The particle size is more preferably 0.5 to 200 (μm), and especially preferably 1 to 100 (μm).

The amount of the metal phosphate to be added is preferably 0.005 parts by weight to 1.2 parts by weight with respect to 100 parts by weight of a polylactic acid resin composition in view of improving the heat resistance and crystallization properties of the polylactic acid resin composition. The amount of the metal phosphate to be added is more preferably 0.015 parts by weight to 0.8 parts by weight, and especially preferably 0.05 parts by weight to 0.5 parts by weight.

Although the timing of addition of the metal phosphate is not limited, it is preferably added with a polylactic acid resin after a polylactic acid resin is obtained, in view of achieving an excellent heat resistance and excellent crystallization properties. The metal phosphate can be added also in the middle of producing a polylactic acid resin including a poly-L-lactic acid component and a poly-D-lactic acid component, or can be added either to a poly-L-lactic acid component or to a poly-D-lactic acid component, which compose the polylactic acid resin.

To enhance alternation of poly-L-lactic acid including L-lactic acid units (segment(s) composed of L-lactic acid) and poly-D-lactic acid including D-lactic acid units (segment(s) composed of D-lactic acid) in a polylactic acid resin finally obtained, polyfunctional compounds can be mixed in the polylactic acid resin composition as long as the effects are not adversely affected.

The polyfunctional compound(s) used herein is not limited, and polyfunctional compounds used in Production Method of a polylactic acid block copolymer described in Production Method 4 can be used.

When the polyfunctional compound is a polyepoxy compound, the polyepoxy compound may be a polymer having a plurality of epoxy groups in one molecule. Specific examples thereof include acrylic resin-based reactive compounds such as a polymer that is a mixture of epoxy-containing acrylic monomers and styrene monomers and a polymer that is a mixture of epoxy-containing acrylic monomers, styrene monomers, and other vinyl monomers.

Examples of the epoxy-containing acrylic monomer include glycidyl (meth)acrylate and glycidyl (meth)acrylate ether. Among them, in terms of the radical polymerizability, glycidyl acrylate or glycidyl (meth)acrylate is preferably used. Any of these monomers may be used alone or two or more of these monomers may be used.

Examples of the styrene monomer include styrene, alpha-methyl styrene, vinyl toluene, p-methyl styrene, t-butyl styrene, o-chloro styrene, and vinylpyridine. Among them, in terms of the affinity to a polylactic acid block copolymer, one or more of styrene and alpha-methyl styrene is (are) preferably used.

Examples of other vinyl monomers include raw material monomers forming amino group-containing acrylic vinyl units such as (meth)acrylic acid, methyl (meth)acrylate, ethyl (meth)acrylate, propyl (meth)acrylate, butyl (meth) acrylate, isobutyl (meth)acrylate, t-butyl (meth)acrylate, 2-ethylhexyl (meth)acrylate, cyclohexyl (meth)acrylate, isobornyl (meth)acrylate, lauryl (meth)acrylate, stearyl (meth)acrylate, hydroxylethyl (meth)acrylate, hydroxypropyl (meth)acrylate, (meth)acrylate of polyethylene glycol or polypropylene glycol, trimethoxysilylpropyl (meth)acrylate, (meth)acrylonitrile, N,N-dialkyl (meth)acrylamide, α-hydroxymethyl acrylate, dimethylaminoethyl acrylate, and dimethylaminoethyl (meth)acrylate. Among them, (meth) acrylic acid, methyl (meth)acrylate, ethyl (meth)acrylate, propyl (meth)acrylate, butyl (meth)acrylate, isobutyl (meth) acrylate, t-butyl (meth)acrylate, 2-ethylhexyl (meth)acrylate, cyclohexyl (meth)acrylate, isobornyl (meth)acrylate, and (meth)acrylonitrile are preferable, and further, (meth) acrylic acid, methyl (meth)acrylate, ethyl (meth)acrylate, butyl (meth)acrylate, 2-ethylhexyl (meth)acrylate, and (meth)acrylonitrile are used. In addition, (meth)acrylamide; dialkyl (meth)acrylamide; aromatic vinyl monomers of vinyl ethers such as vinyl acetate, vinyl ethers, and (meth) allyl ethers; and α olefin monomers such as ethylene and propylene can also be used. These monomers may be used alone or two or more of these monomers may be used as appropriately selected.

When polyepoxy compounds are acrylic resin-based reactive compounds, the number of epoxy groups contained in one molecule of the compound is preferably 2 to 30, more preferably 3 to 20, and still more preferably 4 to 10. If the average number of epoxy groups is less than 2, the degree of increasing viscosity of polylactic acid resin compositions becomes smaller, and molding processability, mechanical properties, durability, and residence stability upon heating are not sufficiently improved. If the average number is over 30, further crosslinking reactions may occur between excess epoxy groups and carboxy groups and/or hydroxyl groups of polylactic acid resin compositions, and molding processability may worsen.

When polyepoxy compounds are acrylic resin-based reactive compounds, the epoxy equivalent of the compound is preferably 50 to 1500 (g/mol), more preferably 100 to 1000 (g/mol), and most preferably 150 to 600 (g/mol) in view of the moldability and reactivity. The epoxy equivalent herein refers to the number of grams of a polymer having 1 equivalent of epoxy groups.

The weight average molecular weight (Mw) of an acrylic resin-based reactive compound containing epoxy group(s) is preferably not less than 1,000 and not more than 15,000, and more preferably not less than 2,000 and not more than 10,000 in view of the reactivity and compatibility to a resin. The weight average molecular weight (Mw) herein refers to the weight average molecular weight of a poly(methyl methacrylate) (PMMA) standard equivalent obtained by gel permeation chromatography (GPC) measurement using hexafluoroisopropanol as the solvent.

Although acrylic resin-based reactive compounds can be manufactured by using known arts to use, commercially available products can also be used. Specific examples of commercially available products suitably used include "Bondfast (registered trademark)" series manufactured by Sumitomo Chemical Co., Ltd.; "Marproof (registered trademark)" series manufactured by NOF corporation; "RESEDA (registered trademark)" series and "ARUFON (registered trademark)" series manufactured by TOAGOSEI Co., Ltd.; and "JONCRYL (registered trademark)" series manufactured by BASF Japan Ltd. Among them, "ARUFON (registered trademark)" series manufactured by TOAGOSEI Co., Ltd. and "JONCRYL (registered trademark)" series manufactured by BASF Japan Ltd. can be more suitably used in view of the reactivity.

The amount of the polyfunctional compound(s) to be mixed is not limited, and is preferably not less than 0.01 parts by weight and not more than 20 parts by weight, more preferably not less than 0.1 parts by weight and not more than 10 parts by weight with respect to 100 parts by weight of the total of poly-L-lactic acid and poly-D-lactic acid. When the amount of the polyfunctional compound(s) added is within the above-described preferred range, the effect of using polyfunctional compound(s) can be sufficiently produced.

Further, when a polyfunctional compound(s) is/are used, a reaction catalyst(s) may be added for promoting the reaction of poly-L-lactic acid and poly-D-lactic acid with the polyfunctional compound(s). As the catalyst(s) used herein, the reaction catalyst(s) used in Production Method of a polylactic acid block copolymer for promoting the reaction of poly-L-lactic acid and poly-D-lactic acid, which is described in Production Method 4, can be used.

The amount of the reaction catalyst(s) to be added is not limited, and is preferably not less than 0.001 parts by weight and not more than 0.5 parts by weight with respect to 100 parts by weight of the total of poly-L-lactic acid and poly-D-lactic acid. When the amount of the catalyst(s) is within the above-described preferred range, the effect of reducing the polymerization time can be obtained, and the molecular weight of the polylactic acid resin finally obtained can be high.

The polylactic acid resin composition may additionally include conventional additives such as catalyst deactivating agents (for example, hindered phenol compounds, thioether compounds, vitamin compounds, triazole compounds, polyamine compounds, compounds of hydrazine derivatives, and phosphorous compounds), and these may also be used in combination. Among these, at least one of phosphorous compounds is preferably contained, and the phosphorous compound(s) is/are more preferably a phosphate compound(s) and/or phosphite compound(s). Still more preferred specific examples of the compounds include "Adekastab (registered trademark)" AX-71 (dioctadecyl phosphate), PEP-8 (distearyl pentaerythritol diphosphite) and PEP-36 (cyclic neopentatetraylbis(2,64-butyl-4-methylphenyl)phosphite) manufactured by ADEKA Corporation; include plasticizers such as polyalkylene glycol plasticizers, polyester plasticizers, polycarboxylate plasticizers, glycerol plasticizers, phosphate plasticizers, epoxy plasticizers, fatty acid amides such as stearamide and ethylene bis-stearamide, pentaerythritol, various sorbitols, polyacrylates, silicone oil and paraffins, and in terms of bleed-out resistance, polyalkylene glycol plasticizers such as polyalkylene glycols and their terminal blocked compounds including terminal epoxy modified compounds, terminal ester modified compounds and terminal ether modified compounds, for example, polyethylene glycol, polypropylene glycol, poly(ethylene oxide/propylene oxide) block and/or random copolymers, polytetramethylene glycol, ethylene oxide addition polymers of bisphenols, propylene oxide addition polymers of bisphenols, tetrahydrofuran addition polymers of bisphenols; polycarboxylate plasticizers such as bis(butyl diglycol) adipate, methyl diglycol butyl diglycol adipate, benzyl methyl diglycol adipate, acetyl tributyl citrate, methoxycarbonylmethyl dibutyl citrate, and ethoxycarbonylmethyl dibutyl citrate; and glycerol plasticizers such as glycerol monoacetomonolaurate, glycerol diacetomonolaurate, glycerol monoacetomonostearate, glycerol diacetomonooleate, and glycerol monoacetomonomontanate; include impact modifiers including natural rubbers; polyethylenes such as low-density polyethylenes and high-density polyethylenes; polypropylenes; impact modified polystyrenes; polybutadienes; polyester elastomers such as styrene/butadiene copolymers, ethylene/propylene copolymers, ethylene/methyl acrylate copolymers, ethylene/ethyl acrylate copolymers, ethylene/vinyl acetate copolymers, ethylene/glycidyl methacrylate copolymers, polyethylene terephthalate/poly(tetramethylene oxide) glycol block copolymers, and polyethylene terephthalate/isophthalate/poly(tetramethylene oxide) glycol copolymers; butadiene core shell elastomers such as MBS; and acrylic core shell elastomers, in which any one of these or two or more of these may be used, and specific examples of the butadiene or acrylic core shell elastomers include "Metablen (registered trademark)" manufactured by MITSUBISHI RAYON CO., LTD., "Kane ace (registered trademark)" manufactured by KANEKA CORPORATION, and "PARALOID (registered trademark)" manufactured by Rohm and Haas Company; include fillers (any of fibrous, plate-like, powdery and granular fillers may be used) such as glass fibers; carbon fibers such as PAN-based and pitch-based carbon fibers; and metal fibers such as stainless steel fibers, aluminum fibers and brass fibers; organic fibers such as aromatic polyamide fibers; gypsum fibers; ceramic fibers; asbestos fibers; zirconia fibers; alumina fibers; silica fibers; fibrous or whisker fibers such as titanium oxide fibers, silicon carbide fibers, rock wool, potassium titanate whiskers, barium titanate whiskers, aluminum borate whiskers, and silicon nitride whiskers; kaolin, silica, calcium carbonate, glass beads, glass flakes, glass microballoons, molybdenum disulfide, wollastonite, montmorillonite, titanium oxide, zinc oxide, calcium polyphosphate, graphite, and barium sulfate; include flame retardants (red phosphorus, brominated polystyrene, brominated polyphenylene ether, brominated polycarbonate, magnesium hydroxide, melamine, cyanuric acid and its salts, silicon compounds, and the like); include ultraviolet absorbers (resorcinol, salicylates, benzotriazole, benzophenone, and the like); include heat stabilizers (hindered phenols, hydroquinone, phosphites and their substitutes, and the like); include lubricants; include mold releasing agents (montanoic acid and its salts, esters, half esters, stearyl alcohol, stearamide and polyethylene wax, and the like); include coloring agents including dyes (nigrosine, and the like) and pigments (cadmium sulfide, phthalocyanine, and the like); include coloring inhibitors (phosphites, hypophosphites, and the like); include conducting agents or coloring agents (carbon black, and the like); include sliding modifiers (graphite, fluororesins, and the like); and include antistatic agents. One of such additives or two or more different additives may be added to the polylactic acid resin composition.

The polylactic acid resin composition may additionally include at least one of other thermoplastic resins (polyethylene, polypropylene, polystyrene, acrylic resins, acrylonitrile/butadiene/styrene copolymers, polyamide, polycarbonate, polyphenylene sulfide resins, polyether ether ketone resins, polyester, polysulfone, polyphenylene oxide, polyacetal, polyimide, polyetherimide, cellulose esters and the like), thermosetting resins (phenol resins, melamine resins, polyester resins, silicone resins, epoxy resins and the like), soft thermoplastic resins (ethylene/glycidyl methacrylate copolymers, polyester elastomers, polyamide elastomers, ethylene/propylene terpolymers, ethylene/butene-1 copolymers and the like) and the like as long as the product is not adversely affected the purpose.

When an acrylic resin is used, preferred examples of the resin generally include acrylic resins containing as a major component alkyl (meth)acrylate units having a $C_1$-$C_4$ alkyl group(s). Further, the alkyl (meth)acrylate having a $C_1$-$C_4$ alkyl group(s) may be copolymerized with another alkyl acrylate having a $C_1$-$C_4$ alkyl group(s) or an aromatic vinyl compound such as styrene.

Examples of the alkyl (meth)acrylate having an alkyl group(s) include methyl acrylate, methyl methacrylate, ethyl acrylate, ethyl methacrylate, butyl acrylate, butyl methacrylate, cyclohexyl acrylate and cyclohexyl methacrylate. When an acrylic resin is used, polymethyl methacrylate composed of methyl methacrylate is especially preferred.

The polylactic acid resin composition has a characteristic that easily allow formation of a polylactic acid stereocomplex having a high melting point even after heat melting and solidification upon processing of the polylactic acid resin composition into a molded article or the like, as a molded product.

In the method of manufacturing the polylactic acid resin composition, although the mixing method of the respective additives is not specifically limited, and any of known methods may be employed, the mixing method by melt mixing is preferable in terms of the easiness of the operation and the homogeneous dispersibility of the additives.

The method of mixing the respective additives by melt mixing is not particularly limited, and any of known methods may be employed for melt mixing. Examples of the kneading machine include single screw extruders, twin screw extruders, plastomill, kneaders and stirring-vessel-type reactors equipped with a pressure reducing device. In view of enabling uniform and sufficient kneading, a single screw extruder or twin screw extruder is preferably used.

The timing of mixing the respective additives is not particularly limited. The respective additives may be pre-mixed with poly-L-lactic acid and poly-D-lactic acid as the raw material; the respective additives may be added simultaneously in the course of mixing poly-L-lactic acid and poly-D-lactic acid; or the respective additives may be added to the pre-produced polylactic acid resin. When solid-state polymerization is performed for the polylactic acid resin, it is preferable that the polymerization catalyst be in the active state, and thus the catalyst deactivating agent is preferably added after the solid-state polymerization.

The temperature condition of melt mixing is preferably 140° C. to 250° C., more preferably 160° C. to 230° C., and particularly preferably 180° C. to 220° C. The temperature more than 250° C. is not preferable because the molecular weight of the mixture is largely decreased, and the temperature not more than 140° C. is also not preferable because fluidity is significantly decreased.

In terms of the time conditions for the mixing, it is preferably 0.1 minutes to 10 minutes, more preferably 0.3 minutes to 5 minutes, and especially preferably 0.5 minutes to 3 minutes. The mixing time not more than 0.1 minutes is not preferable because the respective additives are not uniformly mixed, and the mixing time more than 10 minutes is also not preferable because thermal degradation is likely to occur by the mixing.

The pressure conditions during the mixing are not limited, and the mixing may be carried out either in the air or under an atmosphere of an inert gas such as nitrogen.

In kneading with an extruder, the method of feeding the respective additives is not particularly limited, and available examples include a method of feeding the polylactic acid resin and the respective additives together from a resin hopper; and a method of using a side resin hopper as necessary and separately feeding the polylactic acid resin and the respective additives from the resin hopper and the side resin hopper.

As the screw element in the extruder, it is preferable to provide a mixing unit with a kneading element to homogeneously mix the polylactic acid resin and the respective additives.

The form of the mixture of the polylactic acid resin and the respective additives after melt mixing is not limited, and the mixture may be in the form of a block(s), film(s), pellet(s), powder or the like. In view of efficient progress of the respective steps, a pellet(s) or powder is/are preferably used. Examples of the method of forming the mixture after melt mixing into a pellet(s) include a method in which the mixture is extruded into a strand-like shape and pelletized, and a method in which the mixture is extruded into water and pelletized using an underwater cutter. Examples of the method of forming the mixture after melt mixing into powder include a method in which the mixture is pulverized using a pulverizer such as a mixer, blender, ball mill or hammer mill.

The molded product including the polylactic acid resin composition has transparency even when stretching treatment was not carried out so that it is not necessary to perform stretching treatment to give transparency to the molded product. However, it is also possible to perform stretching treatment as required. The shape of the molded product to be subjected to stretching treatment is preferably a film or a sheet. When the stretching treatment is performed, stretching is preferably carried out within the range from the glass-transition temperature to the melting point of the polylactic acid stereocomplex, more preferably 60° C. to 170° C., still more preferably 70° C. to 150° C.

The polylactic acid block copolymer and the molded product including the polylactic acid block copolymer may be used as a film, sheet, fiber/cloth, non-woven fabric, injection-molded article, extrusion-molded article, vacuum pressure-molded article, blow-molded article, complex with another/other material(s), and the like, and are useful for uses such as agricultural materials, garden materials, fishery materials, civil engineering and construction materials, stationery, medical supplies, automobile parts, electrical/electronic components and optical films.

Specific examples of the uses include electric and electronic parts such as relay cases, coil bobbins, optical pickup chassis, motor cases, notebook type personal computer housings and internal parts, CRT display housings and internal parts, printer housings and internal parts, portable terminal housings and internal parts including cell phones, mobile personal computers and handheld mobile devices, recording medium (for example, CD, DVD, PD and FDD) drive housings and internal parts, copying machine housings and internal parts, facsimile housings and internal parts and parabolic antennas. Additionally, applications also include: household and office electric appliance parts such as VTR parts, TV parts, irons, hair dryers, rice cooker parts, microwave oven parts, audio parts, video equipment parts including video cameras and projectors, substrates of optical recording media including Laserdiscs (registered trademark), compact discs (CD), CD-ROM, CD-R, CD-RW, DVD-ROM, DVD-R, DVD-RW, DVD-RAM and Blu-ray discs, lighting and illumination parts, refrigerator parts, air conditioner parts, typewriter parts and word processor parts. Applications further include: housings and internal parts of electronic musical instruments, home-use game consoles, handheld game consoles; electric and electronic parts such as various gears, various cases, sensors, LEP lamps, connectors, sockets, resistors, relay cases, switches, coil bobbins, capacitors, variable capacitor cases, optical pickups, oscillators, various terminal boards, transformers, plugs, printed wiring boards, tuners, speakers, microphones, headphones, small motors, magnetic head bases, power modules, semiconductors, liquid crystal, FDD carriages, FDD chassis, motor brush holders and transformer components; architectural components such as sliding door rollers, blind curtain parts, pipe joints, curtain liners, blind parts, gas meter parts, water meter parts, water heater parts, roof panels, heat-insulating walls, adjusters, floor posts, ceiling suspenders, stairways, doors and floors; fisheries-related articles such as fish bait bags; civil engineering-related articles such as vegetation nets, vegetation mats, weed growth prevention bags, weed growth prevention nets, protection sheets, slope protection sheets, ash-scattering prevention sheets, drain sheets, water-holding sheets, sludge dewatering bags and concrete forms, automobile underhood parts such as air flow meters, air pumps, thermostat housings, engine mounts, ignition bobbins, ignition cases, clutch bobbins, sensor housings, idle speed control valves, vacuum switching valves, electric control unit (ECU) housings, vacuum pump cases, inhibitor switches, rotation sensors, acceleration sensors, distributor caps, coil bases, actuator cases for ABS, radiator tank tops and bottoms, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves and various pipes; automobile interior parts such as torque control levers, safety belt parts, register blades, washer levers, window regulator handles, window regulator handle knobs, passing light levers, sun visor brackets, and various motor housings; automobile exterior parts such as roof rails, fenders, garnishes, bumpers, door mirror stays, spoilers, hood louvers, wheel covers, wheel caps, grill apron cover frames, lamp reflectors, lamp bezels, and door handles; various automobile connectors such as wire harness connectors, SMJ connectors (board connectors), PCB connectors (relay connectors) and door grommet connectors, machine parts such as gears, screws, springs, bearings, levers, key stems, cams, ratchets, rollers, water supply parts, toy parts, fans, guts, pipes, washing tools, motor parts, microscopes, binoculars, cameras and timepieces; agricultural articles such as multi-films, tunnel films, bird sheets, seedling raising-pots, vegetation piles, seed tapes, germination sheets, house lining sheets, agricultural vinyl film fasteners, slow-acting fertilizers, root protection sheets, horticultural nets, insect nets, seedling tree nets, printed laminates, fertilizer bags, sample bags, sand bags, animal damage preventive nets, attracting ropes and windbreak nets; fillers (fibers) used for mining shale gas/oil and molding materials; sanitary articles; medical articles such as medical films; packaging films of, for example, calendars, stationary, clothing and foods; vessels and tableware such as trays, cups, clear cups for beverages, blisters, knives, forks, spoons, tubes, plastic cans, pouches, containers, tanks and baskets; containers and packages such as hot fill containers, microwave oven cooking containers, clear heat-resistant containers for food, cosmetics containers, wrapping sheets, foam cushioning materials, paper laminates, shampoo bottles, beverage bottles, cups, candy packs, shrinkable labels, cover materials, window envelopes, fruit baskets, tearable tapes, easy peel packages, egg packs, HDD packages, compost bags, recording medium packages, shopping bags and electric/electronic part wrapping films; various clothing articles; and interior articles. Other useful applications include carrier tapes, printed laminates, heat sensitive stencil printing films, mold releasing films, porous films, container bags, credit cards, ATM cards, ID cards, IC cards, optical elements, electrically conductive embossed tapes, IC trays, golf tees, waste bags, plastic shopping bags, various nets, tooth brushes, stationery, clear file folders, briefcases, chairs, tables, cooler boxes, rakes, hose reels, plant pots, hose nozzles, dining tables, desk surfaces, furniture panels, kitchen cabinets, pen caps, and gas lighters.

EXAMPLES

Hereinafter, our compositions, products and methods will be explained with Examples and the like. However, this disclosure is not limited to these Examples. The number of parts herein refers to parts by weight. The method of measuring the physical characteristic and the like will be explained below. Note that the same portions were selected for measurements of molded products.

(1) Molecular Weight

The weight average molecular weight and polydispersity are values which are measured by gel permeation chromatography (GPC) and calculated in terms of poly(methyl methacrylate) standards. The GPC measurement was carried out using: as a detector, WATERS 410, which is a differential refractometer manufactured by WATERS; as a pump, MODEL 510 manufactured by WATERS; and, as a column, Shodex (registered trademark) GPC HFIP-806M and Shodex (registered trademark) GPC HFIP-LG which are manufactured by Showa Denko K.K., and linearly connected. In terms of the conditions for the measurement, the flow rate was 0.5 mL/min. In the measurement, hexafluoroisopropanol was used as a solvent, and 0.1 mL of a solution having a sample concentration of 1 mg/mL was injected.

(2) Thermal Properties

The melting point, the end of melting point and the calorie due to melting were measured with a differential scanning calorimeter manufactured by Perkin-Elmer Corp. In terms of the measurement conditions, measurement was carried out with 5 mg of the sample under a nitrogen atmosphere at a heating rate of 20° C./min.

The melting point herein refers to the temperature at the peak top of the peak due to melting of crystals, and the end of melting point refers to the temperature at the end of the peak due to melting of crystals. In the obtained results, increase of a melting point (the melting point became higher) was judged to be due to formation of a polylactic acid stereocomplex, and a melting point that was not changed was judged to be due to nonoccurrence of formation of a polylactic acid stereocomplex. The melting point of the mixture herein refers to the melting point measured by increasing the temperature at a heating rate of 20° C./min, from 30° C. to 250° C. in the first temperature increase, and the melting point of the polylactic acid block copolymer after solid-state polymerization refers to the melting point measured by increasing the temperature at a heating rate of 20° C./min, from 30° C. to 250° C., during the first temperature increase and then decreasing the temperature at a cooling rate of 20° C./min to 30° C., further followed by increasing the temperature at a heating rate of 20° C./min, from 30° C. to 250° C., during the second temperature increase.

The parameter value represented by Equation (8) was calculated as thermal properties:

$$(Tm-Tms)/(Tme-Tm) \quad (8).$$

In the parameter of Equation (8),

Tm: the melting point derived from stereocomplex crystals of the polylactic acid block copolymer and the mixture of poly-L-lactic acid and poly-D-lactic acid (peak top temperature in the peak due to melting of crystals);

Tms: the start of melting point of stereocomplex crystals of the polylactic acid block copolymer and the mixture of poly-L-lactic acid and poly-D-lactic acid; and Tme: the end of melting point of stereocomplex crystals of the polylactic acid block copolymer and the mixture of poly-L-lactic acid and poly-D-lactic acid.

Each value was measured with a differential scanning calorimeter manufactured by Perkin-Elmer Corp. for 5 mg of the sample under a nitrogen atmosphere. The measured value was a value observed at a temperature of not less than 190° C. and less than 250° C. when the temperature was increased at a heating rate of 40° C./min from 30° C. to 250° C. during the first temperature increase, and then the temperature was decreased at a cooling rate of 40° C./min to 30°

C., further followed by increasing the temperature at a heating rate of 40° C./min from 30° C. to 250° C. during the second temperature increase.

(3) Degree of Stereocomplexation (Sc)

The degree of stereocomplexation (Sc) of the polylactic acid resin composition was calculated according to Equation (5) of below:

$$Sc = \Delta Hh / (\Delta Hl + \Delta Hh) \times 100 \qquad (5)$$

(where ΔHl represents the heat of fusion of crystals of poly-L-lactic acid alone and crystals of poly-D-lactic acid alone, which appears at not less than 150° C. and less than 190° C., and ΔHh represents the heat of fusion of stereocomplex crystals, which appears at not less than 190° C. and less than 250° C.).

The degree of stereocomplexation (Sc) of the polylactic acid resin composition in this example was calculated for the peak due to melting of crystals measured with a differential scanning calorimeter (DSC) during the second temperature increase.

(4) Cooling Crystallization Temperature

The cooling crystallization temperatures of the polylactic acid resin composition was measured with a differential scanning calorimeter manufactured by Perkin-Elmer Corp. More specifically, the temperature of 5 mg of each sample was increased with a differential scanning calorimeter under a nitrogen atmosphere at a heating rate of 20° C./min from 30° C. to 250° C., and the temperature was then kept constant at 250° C. for 3 minutes, followed by decreasing the temperature at a cooling rate of 20° C./min, while measuring the temperature at the crystallization peak top to obtain the cooling crystallization temperature.

(5) Enthalpy of Crystallization (ΔHc)

Enthalpy of crystallization refers to the calculated peak area of the peak due to melting of crystals measured with a differential scanning calorimeter manufactured by Perkin-Elmer Corp.

(6) Weight Loss Percentage

The weight loss percentage of the polylactic acid resin composition was measured by a thermogravimetric analysis with a calorimetric measurement device manufactured by Perkin-Elmer Corp. More specifically, 5 mg of a sample was heated in a calorimetric measurement device under a nitrogen atmosphere at 240° C. as keeping the temperature constant for 30 minutes, and then the weight loss percentage was calculated from each of the weights of the sample before and after heating.

(7) Haze Value

As an index of transparency of the molded product, the haze value was measured. A sheet-shaped molded product having a thickness of 1 mm was subjected to measurement of the haze value using a haze meter NDH-300A manufactured by Nippon Denshoku Industries, according to JIS K 7105.

(8) 130° C. Storage Modulus

As an index of heat resistance of the molded product, the storage modulus was measured. The central portion of a sheet-shaped molded product having a thickness of 1 mm was cut into a piece having a size of 40 mm×2 mm to provide a strip-shaped sample, and the sample was subjected to measurement of the dynamic viscoelasticity using a Dynamic viscoelasticity apparatus (DMS6100 manufactured by Seiko Instruments Inc.) under a nitrogen atmosphere at a heating rate of 2° C./min. at a frequency of 3.5 Hz, to measure the storage modulus at 130° C. It can be said that the higher the modulus, the higher the heat resistance.

(9) Tensile Strength

The central portion of a sheet-shaped molded product having a thickness of 1 mm was cut into a piece having a size of 40 mm×2 mm to provide a strip-shaped sample, and the sample was subjected to measurement of the tensile strength according to ASTM D882.

(10) Impact Resistance

In a container obtained by vacuum forming of a sheet-shaped molded product having a thickness of 1 mm, water was placed, and the lid of the container was closed. The container was then dropped onto concrete from a height of 2 m with its bottom facing downward. The number of times of this operation was counted until the container was broken due to the drop impact to cause leakage of water, and evaluation was carried out by the method described below:

A: The number of times of dropping counted until the container was broken to cause leakage of water was not less than 5;

B: The number of times of dropping counted until the container was broken to cause leakage of water was 2 to 4; and F: The number of times of dropping counted until the container was broken to cause leakage of water was 1.

The poly-L-lactic acid and poly-D-lactic acid used in this example (Examples 1 to 15 and Comparative Examples 1 to 5) are shown below:

PLA1: poly-L-lactic acid obtained in Reference Example 1 (Mw=43,000, and polydispersity: 1.8);

PLA2: poly-L-lactic acid obtained in Reference Example 2 (Mw=135,000, and polydispersity: 1.8);

PLA3: poly-L-lactic acid obtained in Reference Example 3 (Mw=200,000, and polydispersity: 1.9);

PDA1: poly-D-lactic acid obtained in Reference Example 4 (Mw=35,000, and polydispersity: 1.5);

PDA2: poly-D-lactic acid obtained in Reference Example 5 (Mw=60,000, and polydispersity: 1.6);

PDA3: poly-D-lactic acid obtained in Reference Example 6 (Mw=75,000, and polydispersity: 1.6);

PDA4: poly-D-lactic acid obtained in Reference Example 7 (Mw=126,000, and polydispersity: 1.7); and PDA5: poly-D-lactic acid obtained in Reference Example 8 (Mw=198,000, and polydispersity: 1.8).

Reference Example 1

In a reaction vessel equipped with an agitator and a reflux condenser, 50 parts of 90% aqueous L-lactic acid solution was placed, and the temperature was adjusted to 150° C., followed by allowing the reaction to proceed while gradually decreasing the pressure to evaporate water for 3.5 hours. Thereafter, the pressure was adjusted to normal pressure under a nitrogen atmosphere, and 0.02 parts of stannous acetate was added, followed by allowing polymerization reaction to proceed while gradually decreasing the pressure to 13 Pa at 170° C. for 7 hours. Subsequently, the obtained poly-L-lactic acid was subjected to crystallization treatment under a nitrogen atmosphere at 110° C. for 1 hour, and then to solid-state polymerization under a pressure of 60 Pa at 140° C. for 3 hours, at 150° C. for 3 hours, and then at 160° C. for 5 hours, to obtain poly-L-lactic acid (PLA1). The weight average molecular weight of PLA1 was 43,000, the polydispersity was 1.8, and the melting point was 159° C.

Reference Example 2

The polymerization of poly-L-lactic acid was performed to obtain PLA2 in the same manner as in Reference Example 1, except that the time for solid-state polymerization at 160° C. was changed to 12 hours. The weight average molecular weight of PLA2 was 135,000, the polydispersity was 1.8, and the melting point was 168° C.

Reference Example 3

The polymerization of poly-L-lactic acid was performed to obtain PLA3 in the same manner as in Reference Example 1, except that the time for solid-state polymerization at 160° C. was changed to 18 hours. The weight average molecular weight of PLA3 was 200,000, the polydispersity was 1.9, and the melting point was 172° C.

Reference Example 4

In a reaction vessel equipped with an agitator and a reflux condenser, 50 parts of 90% aqueous D-lactic acid solution was placed, and the temperature was adjusted to 150° C., followed by allowing the reaction to proceed while gradually decreasing the pressure to evaporate water for 3.5 hours. Thereafter, the pressure was adjusted to normal pressure under a nitrogen atmosphere, and 0.02 parts of stannous acetate was added, followed by allowing polymerization reaction to proceed while gradually decreasing the pressure to 13 Pa at 170° C. for 7 hours. Subsequently, the obtained poly-D-lactic acid was subjected to crystallization treatment under a nitrogen atmosphere at 110° C. for 1 hour, and then to solid-state polymerization under a pressure of 60 Pa at 140° C. for 3 hours, at 150° C. for 3 hours, and then at 160° C. for 5 hours, to obtain poly-D-lactic acid (PDA1). The weight average molecular weight of PDA1 was 35,000, the polydispersity was 1.5, and the melting point was 155° C.

Reference Example 5

The polymerization of poly-D-lactic acid was performed to obtain PDA2 in the same manner as in Reference Example 4, except that the time for solid-state polymerization at 160° C. was changed to 7 hours. The weight average molecular weight of PDA2 was 60,000, the polydispersity was 1.6, and the melting point was 160° C.

Reference Example 6

The polymerization of poly-D-lactic acid was performed to obtain PDA3 in the same manner as in Reference Example 4, except that the time for solid-state polymerization at 160° C. was changed to 9 hours. The weight average molecular weight of PDA3 was 75,000, the polydispersity was 1.6, and the melting point was 162° C.

Reference Example 7

The polymerization of poly-D-lactic acid was performed to obtain PDA4 in the same manner as in Reference Example 4, except that the time for solid-state polymerization at 160° C. was changed to 12 hours. The weight average molecular weight of PDA4 was 126,000, the polydispersity was 1.7, and the melting point was 165° C.

Reference Example 8

The polymerization of poly-D-lactic acid was performed to obtain PDA5 in the same manner as in Reference Example 4, except that the time for solid-state polymerization at 160° C. was changed to 18 hours. The weight average molecular weight of PDA5 was 198,000, the polydispersity was 1.8, and the melting point was 170° C.

(A) Polylactic Acid Resin

A-1: polylactic acid stereocomplex (mixture of poly-L-lactic acid and poly-D-lactic acid) obtained in Reference Example 9 (Mw=130,000, and polydispersity: 2.6);

A-2: polylactic acid block copolymer obtained in Reference Example 10 (Mw=160,000, and polydispersity: 2.3);

A-3: polylactic acid stereocomplex (mixture of poly-L-lactic acid and poly-D-lactic acid) obtained in Reference Example 11 (Mw=100,000, and polydispersity: 2.8);

A-4: polylactic acid block copolymer obtained in Reference Example 12 (Mw=130,000, and polydispersity: 2.4);

A-5: polylactic acid block copolymer obtained in Reference Example 13 (Mw=150,000, and polydispersity: 1.8);

A-6: polylactic acid stereocomplex (mixture of poly-L-lactic acid and poly-D-lactic acid) obtained in Reference Example 14 (Mw=30,000, and polydispersity: 1.8);

A-7: polylactic acid block copolymer obtained in Reference Example 15 (Mw=50,000, and polydispersity: 1.7);

A-8: polylactic acid stereocomplex (mixture of poly-L-lactic acid and poly-D-lactic acid) obtained in Reference Example 16 (Mw=90,000, and polydispersity: 2.4);

A-9: polylactic acid block copolymer obtained in Reference Example 17 (Mw=110,000, and polydispersity: 2.0);

A-10: polylactic acid stereocomplex (mixture of poly-L-lactic acid and poly-D-lactic acid) obtained in Reference Example 18 (Mw=110,000, and polydispersity: 1.9);

A-11: polylactic acid block copolymer obtained in Reference Example 19 (Mw=130,000, and polydispersity: 1.7);

A-12: polylactic acid complex (mixture of poly-L-lactic acid and poly-D-lactic acid) obtained in Reference Example 20 (Mw=150,000, and polydispersity: 1.8);

A-13: polylactic acid block copolymer obtained in Reference Example 21 (Mw=180,000, and polydispersity: 1.6);

A-14: polylactic acid complex (mixture of poly-L-lactic acid and poly-D-lactic acid) obtained in Reference Example 22 (Mw=160,000, and polydispersity: 1.8);

A-15: polylactic acid block copolymer obtained in Reference Example 23 (Mw=190,000, and polydispersity: 1.6);

A-16: polylactic acid complex (mixture of poly-L-lactic acid and poly-D-lactic acid) obtained in Reference Example 24 (Mw=180,000, and polydispersity: 1.8);

A-17: polylactic acid block copolymer obtained in Reference Example 25 (Mw=230,000, and polydispersity: 1.6); and PLA3: poly-L-lactic acid obtained in Reference Example 3 (Mw=200,000, and polydispersity: 1.9).

Reference Example 9

Prior to mixing PLA3 obtained in Reference Example 3 and PDA1 obtained in Reference Example 4, they were subjected to crystallization treatment under a nitrogen atmosphere at 110° C. for 2 hours. Subsequently, 70 parts by weight of crystallized PLAT was added from the resin hopper of a twin screw extruder, while 30 parts by weight of crystallized PDA1 was added from the side resin hopper provided at the position of L/D=30 which will be described later, and melt mixing was performed. In the twin screw extruder, a plasticization part set to a temperature of 190° C. was provided at the position of L/D=10 from the resin hopper, and a kneading disk was provided at the portion of L/D=30 to provide a screw that allows shearing. This structure enables mixing under shearing. By using a twin screw extruder, PLA3 and PDA1 were melt mixed under vacuum, at a melt mixing temperature of 210° C. to obtain the polylactic acid stereocomplex (A–1). The weight average molecular weight of the polylactic acid stereocomplex (A–1) was 130,000, the polydispersity was 2.6, the melting point was a double peak of 215° C. and 153° C., and the degree of stereocomplexation was 97%.

Reference Example 10

The polylactic acid stereocomplex (A–1) obtained in Reference Example 9 was subjected to crystallization treatment under a nitrogen atmosphere at 110° C. for 1 hour, and then to solid-state polymerization under a pressure of 60 Pa at 140° C. for 3 hours, at 150° C. for 3 hours, and then at 160° C. for 18 hours, to obtain polylactic acid block copolymer (A-2). The weight average molecular weight of the polylactic acid block copolymer (A-2) was 160,000, the polydispersity was 2.3, the melting point was a double peak of 211° C. and 171° C., and the degree of stereocomplexation was 98%.

Reference Example 11

The melt mixing was performed to obtain polylactic acid stereocomplex (A-3) in the same manner as in Reference Example 9, except that each of the amounts of PLA3 and PDA1 supplied to a twin screw extruder was 50 parts by weight. The weight average molecular weight of polylactic acid stereocomplex (A-3) was 100,000, the polydispersity was 2.8, the melting point was 211° C., and the degree of stereocomplexation was 100%.

Reference Example 12

The polylactic acid stereocomplex (A-3) obtained in Reference Example 11 was subjected to solid-state polymerization in the same manner as in Reference Example 10 to obtain polylactic acid block copolymer (A-4). The weight average molecular weight of polylactic acid block copolymer (A-4) was 130,000, the polydispersity was 2.4, the melting point was 212° C., and the degree of stereocomplexation was 100%.

Reference Example 13

In a reaction vessel equipped with an agitator, 100 parts of L-lactide and 0.15 parts of ethylene glycol were uniformly melted under a nitrogen atmosphere at 160° C. Thereafter, 0.01 parts of stannous octoate was added and ring-opening polymerization reaction was performed for 2 hours. After the polymerization reaction, the reaction product was dissolved in chloroform, and unreacted monomers were removed by allowing reprecipitation with stirring in methanol (5 times the amount of the chloroform solution), to obtain poly-L-lactic acid (PLA4). The weight average molecular weight of PLA4 was 80,000, the polydispersity was 1.6, and the melting point was 168° C.

Subsequently, 100 parts of the obtained PLA4 was melted in a reaction vessel equipped with an agitator under a nitrogen atmosphere at 200° C., and 120 parts of D-lactide was fed thereto. Thereafter, 0.01 parts of stannous octoate was added thereto and polymerization reaction was performed for 3 hours. The obtained reaction product was dissolved in chloroform, and unreacted monomers were removed by allowing reprecipitation with stirring in methanol (5 times the amount of the chloroform solution), to obtain a polylactic acid block copolymer (A-5) in which a segment composed of D-lactic acid units is bound to PLA4 composed of L-lactic acid units, which polylactic acid block copolymer has 3 segments. The molecular weight of the A-5 was 150,000, the polydispersity was 1.8, the melting point was a double peak of 209° C. and 171° C., and the degree of stereocomplexation was 95%. The ratio of the weight average molecular weight of the segment composed of L-lactic acid units with respect to the weight average molecular weight of the segment composed of D-lactic acid units, which segments constitute the polylactic acid block copolymer A-5, was 2.7.

Reference Example 14

The melt mixing was performed to obtain polylactic acid stereocomplex (A-6) in the same manner as in Reference Example 9, except that PLA3 supplied to a twin screw extruder was replaced with PLAT. The weight average molecular weight of A-6 was 30,000, the polydispersity was 1.8, the melting point was 215° C., and the degree of stereocomplexation was 100%.

Reference Example 15

The polylactic acid stereocomplex (A-6) obtained in Reference Example 14 was subjected to solid-state polymerization in the same manner as in Reference Example 10 to obtain polylactic acid block copolymer (A-7). The weight average molecular weight of A-7 1.7 was 50,000, the melting point was 213° C., and the degree of stereocomplexation was 100%.

Reference Example 16

The melt mixing was performed to obtain polylactic acid stereocomplex (A-8) in the same manner as in Reference Example 9, except that PLA3 supplied to a twin screw extruder was replaced with PLA2. The weight average molecular weight of A-8 was 90,000, the polydispersity was 2.4, the melting point was 214° C., and the degree of stereocomplexation was 100%.

Reference Example 17

The polylactic acid stereocomplex (A-8) obtained in Reference Example 14 was subjected to solid-state polymerization in the same manner as in Reference Example 10 to obtain polylactic acid block copolymer (A-9). The weight average molecular weight of A-9 was 110,000, the polydispersity was 2.0, the melting point was 212° C., and the degree of stereocomplexation was 100%.

Reference Example 18

The melt mixing was performed to obtain polylactic acid stereocomplex (A-10) in the same manner as in Reference Example 9, except that PLA3 and PDA1 supplied to a twin screw extruder were replaced with PLA2 and PDA4, respectively. The weight average molecular weight of the A-10 was 110,000, the polydispersity was 1.9, the melting point was a double peak of 213° C. and 165° C., and the degree of stereocomplexation was 68%.

Reference Example 19

The polylactic acid stereocomplex (A-10) obtained in Reference Example 18 was subjected to solid-state polymerization in the same manner as in Reference Example 10 to obtain polylactic acid block copolymer (A-11). The weight average molecular weight of the A-11 was 130,000, the polydispersity was 1.7, the melting point was a double peak of 210° C. and 168° C., and the degree of stereocomplexation was 73%.

Reference Example 20

The melt mixing was performed to obtain polylactic acid stereocomplex (A-12) in the same manner as in Reference Example 9, except that PDA1 supplied to a twin screw extruder was replaced with PDA2. The weight average molecular weight of A-12 was 150,000, the polydispersity was 1.8, the melting point was a double peak of 210° C. and 158° C., and the degree of stereocomplexation was 90%.

Reference Example 21

The polylactic acid stereocomplex (A-12) obtained in Reference Example 20 was subjected to solid-state polymerization in the same manner as in Reference Example 10 to obtain polylactic acid block copolymer (A-13). The weight average molecular weight of A-13 was 180,000, the polydispersity was 1.6, the melting point was a double peak of 209° C. and 170° C., and the degree of stereocomplexation was 95%.

Reference Example 22

The melt mixing was performed to obtain polylactic acid stereocomplex (A-14) in the same manner as in Reference Example 9, except that PDA1 supplied to a twin screw extruder was replaced with PDA3. The weight average molecular weight of A-14 was 160,000, the polydispersity was 1.8, the melting point was a double peak of 212° C. and 160° C., and the degree of stereocomplexation was 82%.

Reference Example 23

The polylactic acid stereocomplex (A-14) obtained in Reference Example 22 was subjected to solid-state polymerization in the same manner as in Reference Example 10 to obtain polylactic acid block copolymer (A-15). The weight average molecular weight of A-15 was 190,000, the polydispersity was 1.6, the melting point was a double peak of 210° C. and 172° C., and the degree of stereocomplexation was 88%.

Reference Example 24

The melt mixing was performed to obtain polylactic acid stereocomplex (A-16) in the same manner as in Reference Example 9, except that PDA1 supplied to a twin screw extruder was replaced with PDA5. The weight average molecular weight of A-16 was 180,000, the polydispersity was 1.8, the melting point was a double peak of 212° C. and 171° C., and the degree of stereocomplexation was 50%.

Reference Example 25

The polylactic acid stereocomplex (A-16) obtained in Reference Example 20 was subjected to solid-state polymerization in the same manner as in Reference Example 10 to obtain polylactic acid block copolymer (A-17). The weight average molecular weight of A-17 was 230,000, the polydispersity was 1.6, the melting point was a double peak of 209° C. and 175° C., and the degree of stereocomplexation was 61%.

(B) Phosphorous-based Compounds

- B-1: Sodium dihydrogen phosphate (manufactured by Wako Pure Chemical Industries, Ltd.)
- B-2: Potassium dihydrogen phosphate (manufactured by Wako Pure Chemical Industries, Ltd.)
- B-3: Calcium dihydrogen phosphate (manufactured by Wako Pure Chemical Industries, Ltd.)
- B-4: Disodium hydrogen phosphate (manufactured by Wako Pure Chemical Industries, Ltd.)
- B-5: Dipotassium hydrogen phosphate (manufactured by Wako Pure Chemical Industries, Ltd.)
- B-6: Dioctadecylphosphate (manufactured by ADEKA CORPORATION "Adekastab (registered trademark)" AX-71)
- B-7: Alminium phosphate esters (manufactured by ADEKA CORPORATION "Adekastab (registered trademark)" NA-21)

(C) Polyfunctional Compound

- C-1: Epoxy-containing styrene/acrylic acid ester copolymer ("JONCRYL (registered trademark) ADR-4368" manufactured by BASF Japan Ltd., Mw (in terms of PMMA): 8,000, the epoxy equivalent: 285 g/mol)

Examples 1 to 26

The polylactic acid resin (A), the phosphorous-based compound (B), and the polyfunctional compound (C) were dry blended in a various ratios shown in Tables 1 to 3, and were then melt mixed in a twin screw extruder having a vent. In the twin screw extruder, a plasticization part set to a temperature of 225° C. was provided at the position of L/D=10 from the resin hopper, and a kneading disk was provided at the portion of L/D=30 to provide a screw that allows shearing as described above. This structure enables mixing under shearing, and by using the twin screw extruder, melt mixing was performed under vacuum, at a melt mixing temperature of 220° C. to obtain a pelletized polylactic acid resin composition. Physical characteristics of the polylactic acid resin compositions obtained by the melt mixing are shown in Tables 1 to 3.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Polylactic acid resin (A) | Type | A-1 | A-1 | A-1 | A-2 | A-2 | A-2 | A-2 | A-3 | A-4 | A-5 |
| | Addition amount (part by mass) | 100 | 100 | 100 | 100 | 100 | 100 | 100 | 100 | 100 | 100 |
| Phosphorous-based compound (B) | Type | B-1 | B-1 | B-1 | B-1 | B-1 | B-1 | B-1 | B-1 | B-1 | B-1 |
| | Addition amount (part by mass) | 0.01 | 0.05 | 0.2 | 0.01 | 0.05 | 0.2 | 1.2 | 0.05 | 0.05 | 0.05 |
| Polyfunctional compound (C) | Type | — | — | — | — | — | — | — | — | — | — |
| | Addition amount (part by mass) | — | — | — | — | — | — | — | — | — | — |
| Weight average molecular weight | Ten thousand | 13 | 13 | 13 | 15 | 16 | 16 | 16 | 10 | 13 | 15 |
| Polydispersity | | 2.5 | 2.6 | 2.6 | 2.2 | 2.2 | 2.3 | 2.3 | 2.8 | 2.4 | 1.8 |
| Melting point | °C. | 213/152 | 215/153 | 215/153 | 210 | 211/171 | 211 | 211/168 | 211 | 212 | 209/171 |
| (Tm − Tms)/(Tme − Tm) | | 1.9 | 1.8 | 1.8 | 1.4 | 1.3 | 1.4 | 1.3 | 1.2 | 1.5 | 1.6 |
| Sc | % | 95 | 97 | 98 | 100 | 98 | 100 | 93 | 100 | 100 | 95 |
| Cooling crystallization temperature | °C. | 122 | 125 | 131 | 138 | 139 | 145 | 128 | 144 | 148 | 125 |
| ΔHc | J/g | 21 | 24 | 23 | 25 | 27 | 30 | 10 | 32 | 37 | 21 |
| Weight loss Percentage | % | 0.9 | 0.6 | 0.2 | 0.7 | 0.5 | 0.3 | 0.3 | 0.2 | 0.4 | 0.6 |
| Haze value | % | 9 | 12 | 10 | 5 | 2 | 3 | 15 | 5 | 2 | 9 |
| 130° C. storage Modulus | GPa | 2.0 | 2.3 | 2.2 | 2.9 | 3.1 | 3.2 | 1.9 | 2.1 | 2.7 | 2.8 |
| Tensile strength | MPa | 42 | 44 | 44 | 67 | 70 | 68 | 50 | 40 | 57 | 67 |
| Impact resistance (dropping test) | | B | B | B | A | A | A | B | B | A | A |

TABLE 2

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Polylactic acid resin (A) | Type | A-6 | A-7 | A-8 | A-9 | A-10 | A-11 | A-12 | A-13 | A-14 | A-15 |
| | Addition amount (part by mass) | 100 | 100 | 100 | 100 | 100 | 100 | 100 | 100 | 100 | 100 |
| Phosphorous-based compound (B) | Type | B-1 | B-1 | B-1 | B-1 | B-1 | B-1 | B-1 | B-1 | B-1 | B-1 |
| | Addition amount (part by mass) | 0.05 | 0.05 | 0.05 | 0.05 | 0.05 | 0.05 | 0.05 | 0.05 | 0.05 | 0.05 |
| Polyfunctional compound (C) | Type | — | — | — | — | — | — | — | — | — | — |
| | Addition amount (part by mass) | — | — | — | — | — | — | — | — | — | — |
| Weight average molecular weight | Ten thousand | 3 | 5 | 9 | 11 | 11 | 13 | 15 | 18 | 16 | 19 |
| Polydispersity | | 1.8 | 1.7 | 2.4 | 2.0 | 1.9 | 1.7 | 1.8 | 1.6 | 1.8 | 1.6 |
| Melting point | °C. | 215 | 213 | 214 | 212 | 213/165 | 210/168 | 210/158 | 209/170 | 212/160 | 210/172 |
| (Tm − Tms)/(Tme − Tm) | | 1.6 | 1.3 | 1.8 | 1.6 | 1.9 | 1.8 | 1.8 | 1.5 | 1.8 | 1.6 |
| Sc | % | 100 | 100 | 100 | 100 | 68 | 73 | 90 | 95 | 82 | 88 |
| Cooling crystallization temperature | °C. | 130 | 146 | 128 | 145 | 125 | 130 | 126 | 141 | 120 | 140 |
| ΔHc | J/g | 30 | 40 | 25 | 36 | 20 | 23 | 20 | 35 | 18 | 33 |
| Weight loss percentage | % | 0.6 | 0.3 | 0.6 | 0.4 | 0.3 | 0.2 | 0.6 | 0.4 | 0.4 | 0.2 |
| Haze value | % | 3 | 2 | 4 | 3 | 15 | 10 | 13 | 4 | 16 | 5 |
| 130° C. storage modulus | GPa | 1.7 | 1.8 | 2.0 | 2.3 | 2.1 | 2.0 | 2.2 | 3.0 | 2.5 | 3.1 |

TABLE 2-continued

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Tensile strength | MPa | 35 | 40 | 37 | 49 | 40 | 53 | 46 | 70 | 47 | 68 |
| Impact resistance (dropping test) |  | F | F | F | B | B | B | B | A | B | A |

TABLE 3

|  |  | Example 21 | Example 22 | Example 23 | Example 24 | Example 25 | Example 26 |
|---|---|---|---|---|---|---|---|
| Polylactic acid resin (A) | Type | A-2 | A-2 | A-2 | A-2 | A-2 | A-2 |
|  | Addition amount (part by mass) | 100 | 100 | 100 | 100 | 100 | 100 |
| Phosphorous-based compound (B) | Type | B-2 | B-3 | B-4 | B-5 | B-1 | B-1 |
|  | Addition amount (part by mass) | 0.05 | 0.05 | 0.05 | 0.05 | 0.05 | 0.05 |
| Polyfunctional compound (C) | Type | — | — | — | — | C-1 | C-1 |
|  | Addition amount (part by mass) | — | — | — | — | 0.2 | 0.5 |
| Weight average molecular weight | Ten thousand | 15 | 15 | 16 | 15 | 18 | 20 |
| Polydispersity |  | 2.1 | 2.1 | 2.3 | 2.2 | 2.4 | 2.5 |
| Melting point | °C. | 210 | 211/168 | 211/168 | 210/167 | 209/169 | 207/171 |
| (Tm − Tms)/(Tme − Tm) |  | 1.5 | 1.4 | 1.3 | 1.3 | 1.4 | 1.5 |
| Sc | % | 100 | 98 | 94 | 97 | 95 | 93 |
| Cooling crystallization temperature | °C. | 132 | 125 | 131 | 130 | 135 | 130 |
| ΔHc | J/g | 25 | 25 | 26 | 21 | 25 | 22 |
| Weight loss percentage | % | 0.8 | 0.9 | 0.2 | 0.7 | 0.1 | 0.2 |
| Haze value | % | 3 | 10 | 8 | 7 | 5 | 3 |
| 130° C. storage modulus | GPa | 2.8 | 2.7 | 3.0 | 2.8 | 2.7 | 2.6 |
| Tensile strength | MPa | 69 | 68 | 64 | 66 | 69 | 71 |
| Impact resistance (dropping test) |  | A | A | A | A | A | A |

As a polylactic acid resin, the polylactic acid stereocomplex A-1 was used in Examples 1 to 3, while the polylactic acid block copolymer A-2 was used in Examples 4 to 7. A various adding amounts of sodium dihydrogen phosphate were used for these polylactic acid resins for melt mixing. As a result, a catalyst deactivating effects were obtained with any of the polylactic acid resin compositions, and any of the weight loss percentages at 240° C. for 30 minutes were less than 1.0%. Even after catalysts were deactivated, cooling crystallization temperatures were not less than 120° C., and enthalpy of crystallization (ΔHc) was not less than 20 J/g, and the crystallization properties of any of the polylactic acid resin compositions were excellent. On the other hand, the parameters of thermal properties "(Tm−Tms)/(Tme−Tm)" were 1.8 to 1.9 in Examples 1 to 3, and were 1.3 to 1.4 in Examples 4 to 7. The haze values of molded articles were not more than 15%, resulting in excellent transparency.

In Examples 8 to 10, the polylactic acid resin (A) was changed to each of A-3 to A-5, and each of the polylactic acid resin compositions was produced. The catalyst deactivating effects comparable to those obtained in Examples 1 to 3 were obtained with any of the polylactic acid resins, and any of the weight loss percentages at 240° C. for 30 minutes were less than 1.0%. Even after catalysts were deactivated, cooling crystallization temperatures were not less than 120° C., and enthalpy of crystallization (ΔHc) was also not less than 20 J/g, and thus heat resistances and crystallization properties were confirmed to be excellent. On the other hand, the parameters of thermal properties "(Tm−Tms)/(Tme−Tm)" were 1.2 to 1.6. The haze values of molded articles were less than 10%, showing good mechanical properties on tensile strengths and impact resistances.

In Examples 11 to 16, the polylactic acid resin (A) was changed to each of A-6 to A-11, and each of the polylactic acid resin compositions was produced. With any of the polylactic acid resins, any of the weight loss percentages at 240° C. for 30 minutes were less than 1.0%. Even after catalysts were deactivated, cooling crystallization temperatures were not less than 120° C., and enthalpy of crystallization (ΔHc) was also not less than 20 J/g, and thus heat resistances and crystallization properties were confirmed to be excellent. The parameters of thermal properties "(Tm−Tms)/(Tme−Tm)" were 1.3 to 1.9. The haze values of molded articles were less than 15%, showing that tensile strengths and impact resistances were inferior to those obtained in Examples 1 to 9.

In Examples 17 to 20, the polylactic acid resin (A) was changed to each of A-12 to A-15, and each of the polylactic acid resin compositions was produced. With any of the polylactic acid resins, any of the weight loss percentages at 240° C. for 30 minutes were less than 1.0%. The cooling crystallization temperatures after deactivation of catalysts were not less than 120° C., and enthalpy of crystallization (ΔHc) in Example 17, 18, or 20 was not less than 20 J/g, and that in Example 19 was 18 J/g, and thus heat resistances and crystallization properties of polylactic acid resin compositions according to Examples 17 to 20 were confirmed to be excellent. The parameters of thermal properties "(Tm−Tms)/(Tme−Tm)" were 1.5 to 1.8. The haze values of molded articles were less than 16%. The A-13 and A-15 in which polylactic acid block copolymers were used showed excellent mechanical properties on tensile strengths and impact resistances.

In Examples 21 to 24, the phosphorous-based compound for the polylactic acid resin A-2 was changed to each of B-2 to B-5, and each of the polylactic acid resin compositions was produced. The catalyst deactivating effects were obtained with any of the inorganic compounds of metal phosphates, and the weight loss percentages at 240° C. for 30 minutes were less than 1.0%. Even after catalysts were deactivated, cooling crystallization temperatures were not less than 125° C., and enthalpy of crystallization (ΔHc) was also not less than 20 J/g, and thus heat resistances and crystallization properties were confirmed to be excellent. The parameters of thermal properties "(Tm−Tms)/(Tme−Tm)" were 1.3 to 1.5. The haze values of molded articles were not more than 10%, showing good mechanical properties on tensile strengths, storage moduli, and impact resistances.

In Examples 25 and 26, the polyfunctional compound C-1 was added as a polylactic acid resin composition with various amounts, and when the adding amount of C-1 was larger, the weight average molecular weight of the polylactic acid resin composition tends to be increased. The catalyst deactivating effects were obtained if the polyfunctional compound was further added, and the weight loss percentages at 240° C. for 30 minutes were less than 1.0%. Even after catalysts were deactivated, cooling crystallization temperatures were not less than 130° C., and enthalpy of crystallization (ΔHc) was also not less than 20 J/g, and thus heat resistances and crystallization properties were confirmed to be excellent. The parameters of thermal properties "(Tm−Tms)/(Tme−Tm)" were 1.4 to 1.5. The haze values of molded articles were not more than 5%, showing good mechanical properties on tensile strengths, storage moduli, and impact resistances.

Comparative Examples 1 to 7

As described in Examples 1 to 26, the polylactic acid resin (A), the phosphorous-based compound (B), and the polyfunctional compound (C) were dry blended in a various ratios shown in Table 4, and were then melt mixed in a twin screw extruder having a vent. In Comparative Examples 1 to 7, pelletized polylactic acid resin compositions were obtained also by using the above-described twin screw extruder. Physical characteristics of the polylactic acid resin compositions obtained by the melt mixing are shown in Table 4.

In Comparative Example 1, poly-L-lactic acid having a weight average molecular weight of 200,000 was used as a polylactic acid resin. By adding the phosphorous-based compound B-1, the catalyst deactivating effect was obtained, and the weight loss percentage at 240° C. for 30 minutes was 0.7%, which was a good result. However, the melting point of the polylactic acid resin composition was observed only at 168° C. that was derived from poly-L-lactic acid, and the haze value of the molded article was 90%, which was high, and thus inferior for transparency compared to the results obtained in Examples 1 to 15. In addition, the parameter of thermal properties "(Tm−Tms)/(Tme−Tm)" was 2.0, which was higher than the parameter values of the polylactic acid block copolymer obtained in Examples 4 to 9.

In Comparative Examples 2 and 3, 0.0025 parts by weight or 1.5 parts by weight of the inorganic compound of metal phosphate B-1 was added to 100 parts by weight of the polylactic acid resin A-2. As a result, the weight loss percentages at 240° C. for 30 minutes in Comparative Examples 2 and 3 were inferior compared to those obtained in Examples 1 to 26. Moreover, in Comparative Example 3, ΔHc at the time of cooling crystallization was 3 J/g, which means that the crystallization properties were inferior compared to those obtained in Examples. Furthermore, although the weight loss percentage in Comparative Example 3 was 0.3%, which was a good result; the haze value of the molded article was 15%, which was inferior compared to those obtained in Examples 1 to 26.

In Comparative Example 4, the organic phosphoester compound, B-6: Dioctadecylphosphate (manufactured by ADEKA CORPORATION "Adekastab (registered trademark)" AX-71) was used as a phosphorous-based compound. The weight loss percentage of the polylactic acid resin composition was 0.6%, and the catalyst deactivating effect was obtained; however, among thermal properties, the cooling crystallization temperature was 110° C., which was lower compared to those obtained in Examples 1 to 26, and the enthalpy of crystallization (ΔHc) observed was only 3

TABLE 4

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Polylactic acid resin (A) | Type | PLA3 | A-2 | A-2 | A-2 | A-2 | A-16 | A-17 |
| | Addition amount (part by mass) | 100 | 100 | 100 | 100 | 100 | 100 | 100 |
| Phosphorous-based compound (B) | Type | B-1 | B-1 | B-1 | B-6 | B-7 | B-1 | B-1 |
| | Addition amount (part by mass) | 0.05 | 0.0025 | 1.5 | 0.2 | 0.2 | 0.05 | 0.05 |
| Polyfunctional compound (C) | Type | — | — | — | — | — | — | — |
| | Addition amount (part by mass) | — | — | — | — | — | — | — |
| Weight average molecular weight | Ten thousand | 20 | 12 | 15 | 15 | 11 | 18 | 23 |
| Polydispersity | | 1.6 | 2.0 | 2.2 | 2.3 | 2.0 | 1.8 | 1.6 |
| Melting point | ° C. | 168 | 209 | 210/167 | 207/167 | 207/167 | 212/171 | 209/175 |
| (Tm − Tms)/(Tme − Tm) | | 2.0 | 1.4 | 1.4 | 1.4 | 1.4 | 2.2 | 2.1 |
| Sc | % | 0 | 100 | 91 | 87 | 98 | 50 | 61 |
| Cooling crystallization Temperature | ° C. | ND | 109 | 115 | 110 | 148 | 110 | 115 |
| ΔHc | J/g | 0 | 5 | 3 | 3 | 40 | 1 | 4 |
| Weight loss percentage | % | 0.7 | 12.2 | 3.0 | 0.6 | 10.8 | 0.4 | 0.3 |
| Haze value | % | 90 | 6 | 18 | 17 | 1 | 46 | 30 |
| 130° C. storage modulus | GPa | 1.4 | 2.1 | 1.7 | 2.4 | 3.0 | 3.0 | 3.2 |
| Tensile strength | MPa | 60 | 53 | 40 | 65 | 57 | 61 | 65 |
| Impact resistance (dropping test) | | B | B | F | A | B | B | A |

J/g. Moreover, the haze value of the molded article was 17%, which was inferior compared to those obtained in Examples 1 to 26.

In Comparative Example 5, the organic phosphoester compound, aluminum phosphate ester (manufactured by ADEKA CORPORATION "Adekastab (registered trademark)" NA-21) was used as a phosphorous-based compound. The cooling crystallization temperature of the polylactic acid resin composition was 148° C., and the enthalpy of crystallization (ΔHc) was 40 J/g, which indicate excellent crystallization properties. However, the weight loss percentage was 10.8%, which was too high to obtain a sufficient catalyst deactivating effect. On the other hand, although the haze value of the molded article of the polylactic acid resin composition was 1%, which indicates excellent transparency; the impact resistance was slightly inferior compared to those obtained in Examples 1 to 15.

In Comparative Examples 6 and 7, the polylactic acid resin (A) was changed to A-12 or A-13, and each of polylactic acid resin compositions was produced. Each of the weight loss percentages of the polylactic acid resin compositions was less than 0.6%, and the catalyst deactivating effect was obtained. However, among thermal properties, the cooling crystallization temperature was 110° C. or 115° C., which was lower compared to those obtained in Examples 1 to 21, and the enthalpy of crystallization (ΔHc) was less than 5 J/g, indicating that the crystallization properties were inferior compared to those obtained in Examples. Each of the parameters of thermal properties "(Tm−Tms)/(Tme−Tm)" was 2.2 or 2.1. Moreover, the haze value of the molded article was 46% in Comparative Example 6, and 30% in Comparative Example 7, indicating that the transparency was low.

INDUSTRIAL APPLICABILITY

In a polylactic acid resin composition, a molded product, and a method of manufacturing a polylactic acid resin composition, a molecular weight and a melting point are high, a weight loss percentage at the time of melting retention is low, and a cooling crystallization temperature is high. Thus, the polylactic acid resin composition, the molded product, and the method of manufacturing a polylactic acid resin composition can suitably be applied to the fields in which heat resistance and crystallization properties are required.

The invention claimed is:

1. A polylactic acid resin composition comprising:
0.005 parts by weight to 1.2 parts by weight of a metal phosphate represented by Formula (1):

$$M_xH_yPO_z \qquad (1)$$

wherein M is an alkali metal atom or an alkaline earth metal atom, and x, y, and z are integers satisfying 1≤x≤2, 1≤y≤4, and 2≤z≤8, respectively, with respect to 100 parts by weight of a polylactic acid resin comprising a poly-L-lactic acid component and a poly-D-lactic acid component, and wherein a crystallization enthalpy of crystals in the polylactic acid resin is not less than 5 J/g when a temperature of the polylactic acid resin composition is increased to 250° C., the temperature is kept constant for 3 minutes, followed by decreasing the temperature at a cooling rate of 20° C/min in differential scanning calorimetry, and the cooling crystallization temperature is 120° C. or higher, the polylactic acid resin composition does not contain a polyfunctional compound other than the polylactic acid resin, and the polylactic acid resin comprises a polylactic acid block copolymer composed of
poly-L-lactic acid segments containing L-lactic acid as a main component, and
poly-D-lactic acid segments containing D-lactic acid as a main component.

2. The composition according to claim 1, wherein the metal phosphate is at least one selected from the group consisting of sodium dihydrogen phosphate, potassium dihydrogen phosphate, lithium dihydrogen phosphate, calcium dihydrogen phosphate, disodium hydrogen phosphate, dipotassium hydrogen phosphate, calcium hydrogen phosphate, barium hydrogen phosphate, magnesium hydrogen phosphate, sodium hydrogen phosphite, potassium phosphite, calcium hydrogen phosphite, sodium hypophosphite, potassium hypophosphite, and calcium hypophosphite.

3. The composition according to claim 1, wherein a weight loss percentage after the polylactic acid resin composition is heated at 240° C. for 30 minutes in a thermogravimetric analysis is less than 1.0%.

4. The composition according to claim 1, wherein the polylactic acid block copolymer is obtained by mixing poly-L-lactic acid and poly-D-lactic acid under a condition of a combination 1 and/or a combination 2:
a combination 1, in which one of the poly-L-lactic acid and the poly-D-lactic acid has a weight average molecular weight of not less than 60,000 and not more than 300,000, and the other has a weight average molecular weight of not less than 10,000 and not more than 100,000, and/or
a combination 2, in which a ratio between the weight average molecular weight of the poly-L-lactic acid and the weight average molecular weight of the poly-D-lactic acid is not less than 2 and less than 30,
to obtain a mixture in which Sc satisfies Equation (3):

$$Sc=\Delta Hh/(\Delta Hl+\Delta Hh)\times 100>60 \qquad (3)$$

where
ΔHh represents heat of fusion of stereocomplex crystals (J/g) by increasing a temperature at a heating rate of 20° C./min in differential scanning calorimetry, and
ΔHl represents heat of crystals (J/g) of poly-L-lactic acid alone or crystals (J/g) of poly-D-lactic acid alone by increasing a temperature at a heating rate of 20° C./min in differential scanning calorimetry, and that has a weight average molecular weight of not less than 90,000, followed by solid-state polymerization of the mixture at a temperature lower than a melting point of the mixture.

5. The composition according to claim 1, wherein the polylactic acid block copolymer is obtained by mixing poly-L-lactic acid and poly-D-lactic acid under a condition of a combination 3 and/or a combination 4:
a combination 3, in which one of the poly-L-lactic acid and the poly-D-lactic acid has a weight average molecular weight of not less than 60,000 and not more than 300,000, and the other has a weight average molecular weight of not less than 10,000 and not more than 50,000, and/or
a combination 4, in which a ratio between the weight average molecular weight of the poly-L-lactic acid and the weight average molecular weight of the poly-D-lactic acid is not less than 2 and less than 30, to obtain a mixture in which Sc satisfies Equation (3):

$$Sc=\Delta Hh/(\Delta Hl+\Delta Hh)\times 100>60 \qquad (3)$$

where

ΔHh represents heat of stereocomplex crystals (J/g) by increasing a temperature at a heating rate of 20° C./min in differential scanning calorimetry, and ΔHl represents heat of fusion of crystals (J/g) of poly-L-lactic acid alone or crystals (J/g) of poly-D-lactic acid alone by increasing a temperature at a heating rate of 20° C./min in differential scanning calorimetry, and that has a weight average molecular weight of not less than 90,000, followed by solid-state polymerization of the mixture at a temperature lower than a melting point of the mixture.

6. The composition according to claim 1, wherein the polylactic acid block copolymer satisfies Equation (4):

$$1<(Tm-Tms)/(Tme-Tm)<1.8 \qquad (4)$$

where

Tm refers to a melting point attributed to stereocomplex crystals observed within a temperature range of not less than 190° C. and less than 250° C. when a temperature was increased at a heating rate of 40° C./min in differential scanning calorimetry, Tms refers to a start of melting point derived from stereocomplex crystals observed within the temperature range of not less than 190° C. and less than 250° C. when the temperature was increased at a heating rate of 40° C./min in differential scanning calorimetry, and Tme refers to an end of melting point of stereocomplex crystals observed within the temperature range of not less than 190° C. and less than 250° C. when the temperature was increased at a heating rate of 40° C./min in differential scanning calorimetry.

7. The composition according to claim 1, wherein a weight average molecular weight of the polylactic acid resin is not less than 100,000 and not more than 300,000.

8. The composition according to claim 1, wherein the metal phosphate is at least one selected from the group consisting of sodium dihydrogen phosphate, potassium dihydrogen phosphate, lithium dihydrogen phosphate, calcium dihydrogen phosphate, calcium hydrogen phosphate, barium hydrogen phosphate, magnesium hydrogen phosphate, sodium hydrogen phosphite, potassium phosphite, calcium hydrogen phosphite, sodium hypophosphite, potassium hypophosphite, and calcium hypophosphite.

9. A molded product made from a polylactic acid resin composition comprising:

0.005 parts by weight to 1.2 parts by weight of a metal phosphate represented by Formula (1):

$$M_xH_yPO_z \qquad (1)$$

wherein M is an alkali metal atom or an alkaline earth metal atom, and x, y and z are integers satisfying $1\leq x\leq 2$, $1\leq y\leq 4$, and $2\leq z\leq 8$, respectively, with respect to 100 parts by weight of a polylactic acid resin comprising a poly-L-lactic acid component and a poly-D-lactic acid component, and wherein a crystallization enthalpy of crystals in the polylactic acid resin is not less than 5 J/g when a temperature of the polylactic acid resin composition is increased to 250° C., the temperature is kept constant for 3 minutes, followed by decreasing the temperature at a cooling rate of 20° C./min in differential scanning calorimetry, and the cooling crystallization temperature is 120° C. or higher, the polylactic acid resin composition does not contain a polyfunctional compound other than the polylactic acid resin, and the polylactic acid resin comprises a polylactic acid block copolymer composed of poly-L-lactic acid segments containing L-lactic acid as a main component, and poly-D-lactic acid segments containing D-lactic acid as a main component.

10. A method of manufacturing a polylactic acid resin composition including:

0.005 parts by weight to 1.2 parts by weight of a metal phosphate represented by Formula (1):

$$M_xH_yPO_z \qquad (1)$$

wherein M is an alkali metal atom or an alkaline earth metal atom, and x, y, and z are integers satisfying $1\leq x\leq 2$, $1\leq y\leq 4$, and $2\leq z\leq 8$, respectively, with respect to 100 parts by weight of a polylactic acid resin comprising a poly-L-lactic acid component and a poly-D-lactic acid component, and wherein a crystallization enthalpy of crystals in the polylactic acid resin is not less than 5 J/g when a temperature of the polylactic acid resin composition is increased to 250° C., the temperature is kept constant for 3 minutes, followed by decreasing the temperature at a cooling rate of 20° C/min in differential scanning calorimetry, and the cooling crystallization temperature is 120° C. or higher, the polylactic acid resin includes a polylactic acid block copolymer composed of poly-L-lactic acid segments containing L-lactic acid as a main component, poly-D-lactic acid segments containing D-lactic acid as a main component, and the polylactic acid resin composition does not contain a polyfunctional compound other than the polylactic acid resin, the method comprising:

obtaining the polylactic acid block copolymer; and melt mixing the metal phosphate.

* * * * *